(12) United States Patent
Hwang et al.

(10) Patent No.: US 12,363,751 B2
(45) Date of Patent: Jul. 15, 2025

(54) RESOURCE ALLOCATION METHOD FOR SIDELINK

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 370 days.

(21) Appl. No.: 17/789,737

(22) PCT Filed: Jan. 6, 2021

(86) PCT No.: PCT/KR2021/000148
§ 371 (c)(1),
(2) Date: Jun. 28, 2022

(87) PCT Pub. No.: WO2021/141389
PCT Pub. Date: Jul. 15, 2021

(65) Prior Publication Data
US 2023/0060019 A1    Feb. 23, 2023

(30) Foreign Application Priority Data
Jan. 8, 2020 (KR) .......... 10-2020-0002411

(51) Int. Cl.
*H04W 72/542* (2023.01)
*H04W 24/08* (2009.01)
*H04W 52/36* (2009.01)
(52) U.S. Cl.
CPC ......... *H04W 72/542* (2023.01); *H04W 24/08* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 2014/0269355 A1* | 9/2014 | Monogioudis | H04W 52/10 370/252 |
| 2015/0208401 A1* | 7/2015 | Lu | H04W 76/11 455/452.1 |

(Continued)

FOREIGN PATENT DOCUMENTS

WO    2017171895    10/2017

OTHER PUBLICATIONS

Ericsson, PHY layer procedures for NR sidelink, R1-1912603, 3GPP TSG-RAN WG1 Meeting #99, Reno, NV, USA, Nov. 8, 2019, see sections 4.1-4.2.

(Continued)

*Primary Examiner* — Adnan Baig
(74) *Attorney, Agent, or Firm* — BRYAN CAVE LEIGHTON PAISNER LLP

(57) ABSTRACT

According to one disclosure of the present specification, provided is a method for performing communication with a second UE (user equipment) by a first UE. The method can comprise the steps of: receiving control information from a third UE; receiving a sidelink signal from the third UE; measuring reference signal received power (RSRP) of the sidelink signal on the basis of the control information; calculating effective RSRP on the basis of the control information and the measured RSRP; and allocating a resource for communication with the second UE on the basis of the effective RSRP, wherein the control information can comprise information relating to transmission power of the third UE.

9 Claims, 24 Drawing Sheets

(56) References Cited

U.S. PATENT DOCUMENTS

2016/0302230 A1* 10/2016 Novlan .............. H04L 27/0006
2019/0356451 A1* 11/2019 Zhang ................ H04W 52/383
2021/0176747 A1*  6/2021 Yang .................... H04L 5/0044
2022/0182967 A1*  6/2022 Yoshioka ............ H04W 64/003

OTHER PUBLICATIONS

NEC, Physical layer procedures for NR sidelink, R1-1912619, 3GPP TSG RAN WG1 #99, Reno, USA, Nov. 8, 2019, see sections 2-3.

LG Electronics, Discussion on physical layer procedures for NR sidelink, R1-1913237, 3GPP TSG RAN WG1 Meeting #99, Reno, USA, Nov. 13, 2019, see sections 2-3.

LG Electronics, Feature lead summary for AI 7.2.4.5 Physical layer procedures for sidelink, R1-1913280, 3GPP TSG RAN WG1 #99, Reno, USA, Nov. 25, 2019, see section 2.

* cited by examiner

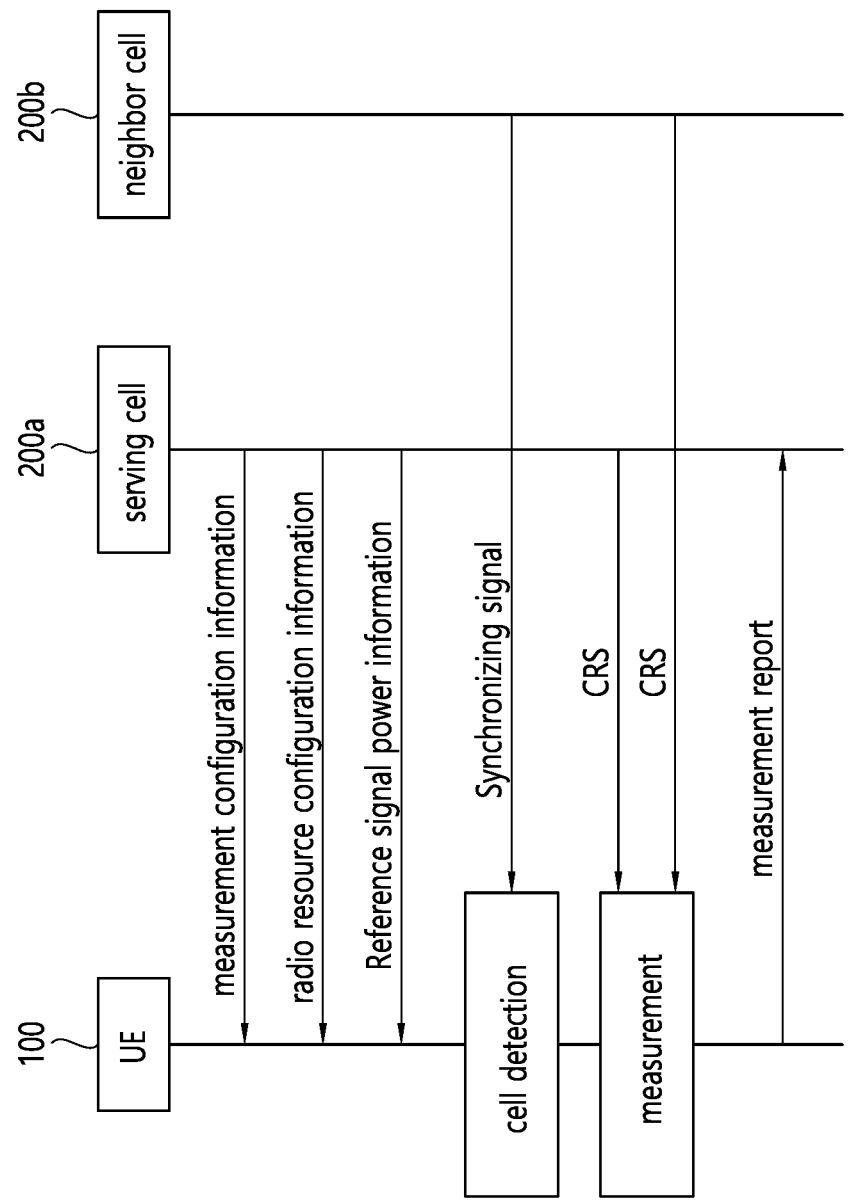

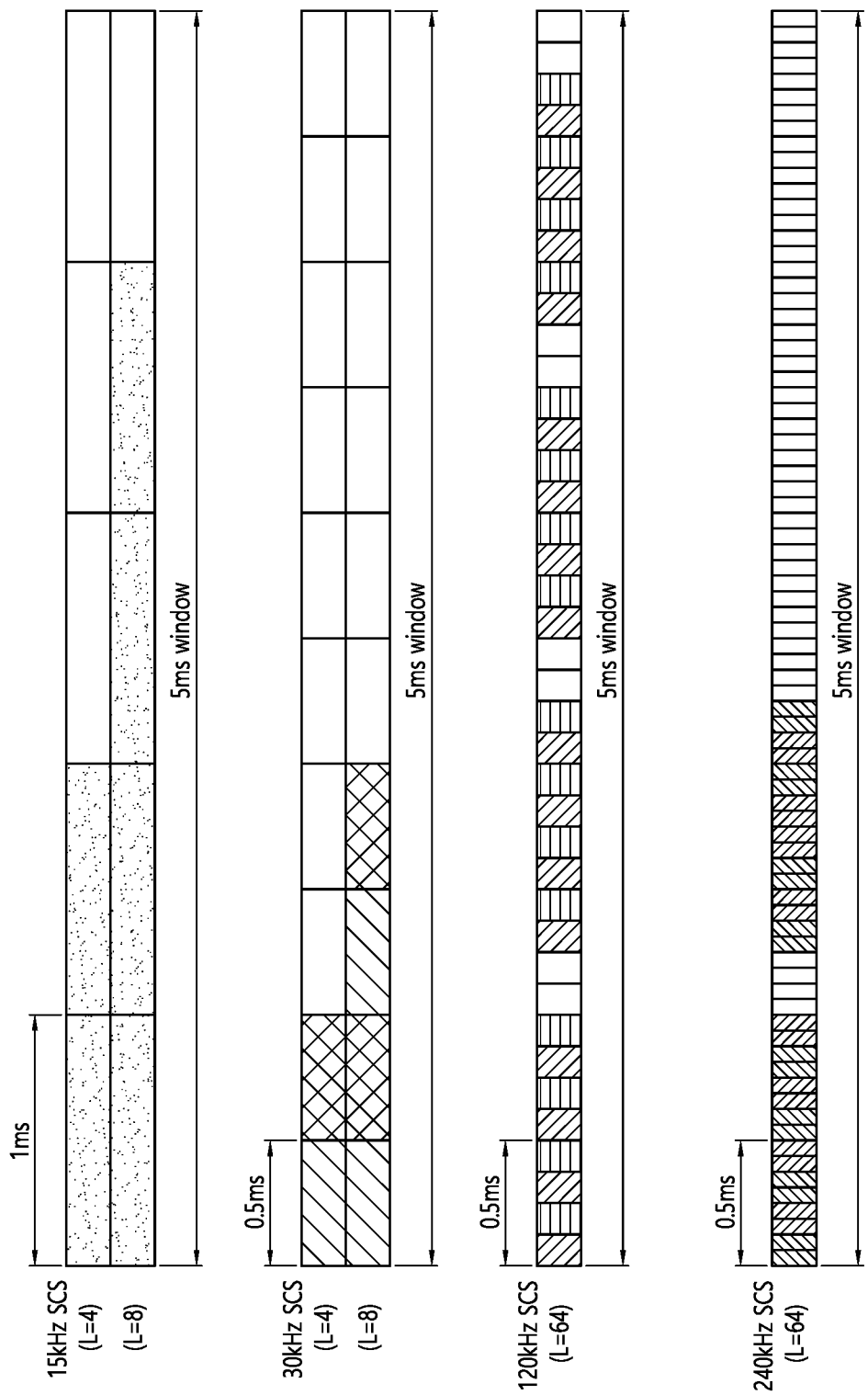

A: RSRP from UE1 using max Tx power
B: RSRP from UE1 using low Tx power by power control

RESOURCE ALLOCATION METHOD FOR SIDELINK

This application is the National Stage filing under 35 U.S.C. 371 of International Application No. PCT/KR2021/000148 filed on Jan. 6, 2021, which claims priority to Korean Patent Application No. 10-2020-0002411 filed on Jan. 8, 2020, the contents of which are all hereby incorporated by reference herein in their entirety.

The present specification relates to mobile communications.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

For the 5G mobile communication, new radio access technology (new RAT or NR) has been researched.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

Sidelink communication is supported in 5G mobile communication. However, in the conventional sidelink mobile communication, there is no method for UE to effectively select a resource to be used for the sidelink communication. Therefore, there is a need for a method for effectively selecting resources while minimizing interference from other UE when UE performs sidelink communication.

SUMMARY

One aspect of the present specification is to efficiently provide resource allocation for sidelink.

When performing communication through the sidelink between terminals, in order to perform communication in consideration of interference by adjacent terminals, one disclosure of the present specification is that terminal measures the strength of a signal from an adjacent terminal, compensates this measurement to valid measurement value, and allocates resource for sidelink by using the valid measurement value.

The present specification may have various effects.

For example, through the procedure disclosed in this specification, resource allocation may be performed in consideration of the actual transmission power of the adjacent terminal in the sidelink, and effective resource allocation may be possible by minimizing the influence by the adjacent terminal when allocating resources for the sidelink.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 3 shows the cell detection and measurement procedure.

FIGS. 6a and 6b are exemplary views showing the structure of SSB in NR.

DETAILED DESCRIPTION

Figure 1:
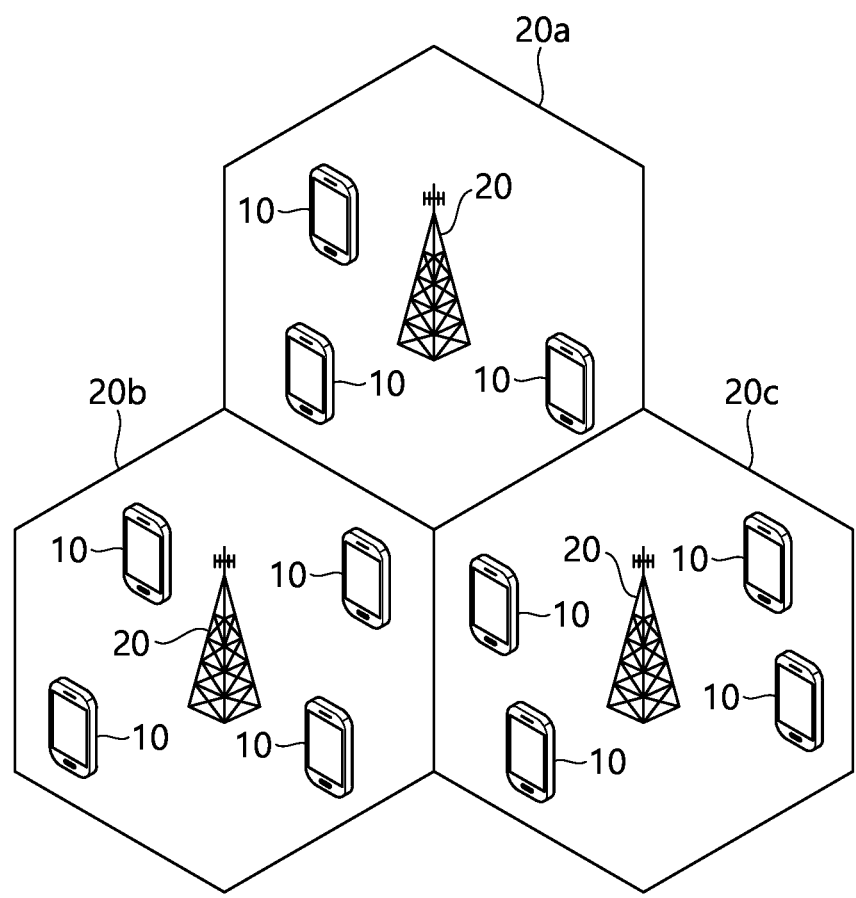
FIG. 1 is a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are individually described in one drawing in this specification may be implemented individually or simultaneously.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, which may be called other terms such as an evolved-NodeB (eNodeB), an evolved-NodeB (eNB), a BTS (Base Transceiver System), an access point (Access Point), gNB (Next generation NodeB).

I. Techniques and Procedures Applicable to the Disclosure of this Specification

FIG. 1 is a wireless communication system.

As can be seen with reference to FIG. 1, the wireless communication system includes at least one base station (BS) 20. Each base station 20 provides a communication service for a specific geographic area (commonly referred to as a cell) 20a, 20b, 20c. A cell may again be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

Hereinafter, the LTE system will be described in more detail.

Figure 2:
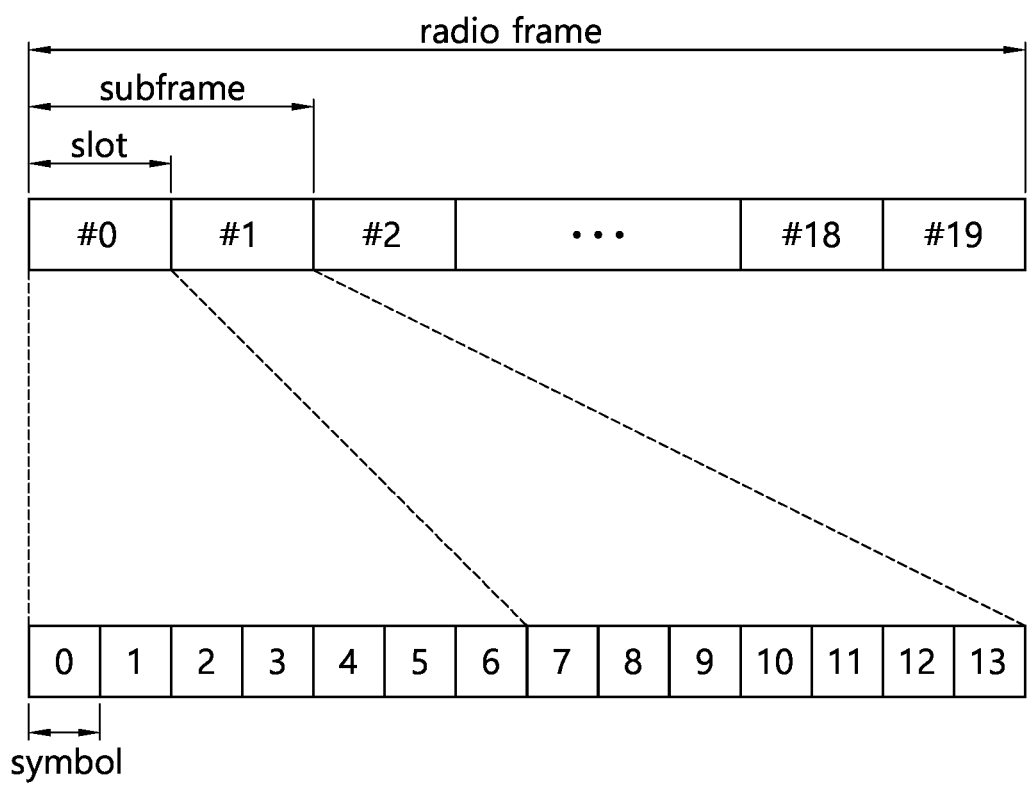
FIG. 2 shows the structure of a radio frame according to FDD in 3GPP LTE.

FIG. 2 shows the structure of a radio frame according to FDD in 3GPP LTE.

Referring to FIG. 2, a radio frame includes 10 subframes, and one subframe includes two slots. The slots in the radio frame are numbered from 0 to 19. The time it takes for one subframe to be transmitted is referred to as a transmission time interval (TTI). The TTI may be referred to as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame or the number of slots included in the subframe may be variously changed.

Meanwhile, one slot may include a plurality of orthogonal frequency division multiplexing (OFDM) symbols. How many OFDM symbols are included in one slot may vary according to a cyclic prefix (CP).

One slot includes NRB resource blocks (RBs) in a frequency domain. For example, in the LTE system, the number of resource blocks (RBs), that is, NRB may be any one of 6 to 110.

A resource block (RB) is a resource allocation unit and includes a plurality of subcarriers in one slot. For example, if one slot includes 7 OFDM symbols in the time domain and the resource block includes 12 subcarriers in the frequency domain, one resource block may include 7*12 resource elements (REs).

In 3GPP LTE, physical channels are divided into data channels, such as PDSCH (Physical Downlink Shared Channel) and PUSCH (Physical Uplink Shared Channel), and control channels, such as PDCCH (Physical Downlink Control Channel), PCFICH (Physical Control Format Indicator Channel), PHICH (Physical Hybrid-ARQ Indicator Channel) and PUCCH (Physical Uplink Control Channel).

The uplink channel includes PUSCH, PUCCH, SRS (Sounding Reference Signal), and PRACH (Physical Random Access Channel).

<Measurement and Measurement Report>

In a mobile communication system, support for mobility of the UE 100 is essential. Accordingly, the UE 100 continuously measures the quality of the serving cell providing the current service and the quality of the neighboring cell. The UE 100 reports the measurement result to the network at an appropriate time, and the network provides optimal mobility to the UE through handover or the like. Measurements for this purpose are often referred to as radio resource management (RRM) measurements.

Meanwhile, the UE 100 monitors the downlink quality of the primary cell (Pcell) based on the CRS. This is called RLM (Radio Link Monitoring).

FIG. 3 shows the cell detection and measurement procedure.

As can be seen with reference to FIG. 3, the UE detects a neighboring cell based on a synchronization signal (SS) transmitted from the neighboring cell. The SS may include a Primary Synchronization Signal (PSS) and a Secondary Synchronization Signal (SSS).

And, when the serving cell 200a and the neighbor cell 200b each transmit a CRS (Cell-specific Reference Signal) to the UE 100, the UE 100 performs measurement through the CRS, and the measurement result is transmitted to the serving cell 200a. In this case, the UE 100 compares the power of the received CRS based on information on the received reference signal power.

In this case, the UE 100 may perform measurement in the following three methods.

1) RSRP (reference signal received power): Indicates the average received power of all REs carrying CRS transmitted over the entire band. At this time, instead of CRS, the average received power of all REs carrying CSI (Channel State Information)-RS (Reference Signal) may be measured.

2) RSSI (received signal strength indicator): indicates received power measured in the entire band. RSSI includes signals, interference, and thermal noise.

3) RSRQ (reference symbol received quality): indicates CQI, and may be determined as RSRP/RSSI according to a measurement bandwidth or subband. That is, RSRQ means a signal-to-noise interference ratio (SINR). Since RSRP does not provide sufficient mobility information, RSRQ may be used instead of RSRP in a handover or cell reselection process.

It can be calculated as RSRQ=RSSI/RSSP.

On the other hand, as shown, the UE 100 receives a radio resource configuration (Radio Resource Configuration) information element (IE: Information Element) from the serving cell (100a) for the measurement. The Radio Resource Configuration Dedicated (IE) information element (IE) is used for setting/modifying/releasing a radio bearer, or modifying a MAC configuration. The radio resource configuration IE includes subframe pattern information. The subframe pattern information is information on a measurement resource restriction pattern on the time domain for measuring RSRP and RSRQ for a serving cell (e.g. a primary cell).

Meanwhile, the UE 100 receives a measurement configuration (hereinafter, also referred to as 'measconfig') information element (IE) from the serving cell 100a for the measurement. A message including a measurement configuration information element (IE) is referred to as a measurement configuration message. Here, the measurement configuration information element (IE) may be received through an RRC connection reconfiguration message. If the measurement result satisfies the reporting condition in the measurement configuration information, the UE reports the measurement result to the base station. A message including the measurement result is called a measurement report message.

The measurement setting IE may include measurement object information. The measurement object information is information about an object on which the UE performs measurement. The measurement object includes at least one of an intra-frequency measurement object that is an intra-cell measurement object, an inter-frequency measurement object that is an inter-cell measurement object, and an inter-RAT measurement object that is an inter-RAT measurement object. For example, the intra-frequency measurement object may indicate a neighboring cell having the same frequency band as the serving cell, the inter-frequency measurement object may indicate a neighboring cell having a different frequency band from the serving cell, and the inter-RAT measurement object may indicate a neighboring cell of a RAT different from the RAT of the serving cell.

TABLE 1

Measurement Object Field Descriptions
carrierFreq
Indicates the E-UTRA carrier frequency to which this setting applies.
measCycleSCell
Indicates a cycle for measuring the SCell in an inactive state. The value may be set to 160, 256, etc. When the value is 160, it indicates that measurement is performed every 160 subframes.

On the other hand, the measurement configuration IE includes an IE (information element) as shown in the table below.

TABLE 2

MeasConfig Field Descriptions
allow Interruptions
When the value is True, this indicates that transmission and reception with the serving cell is allowed to stop when the UE performs measurement using MeasCycleScell on carriers of the deactivated Scell.
measGapConfig
MeasConfig Field Descriptions
Setting or disabling the measurement gap The measGapConfig is used to set or release a measurement gap (MG). The measurement gap MG is a period for performing cell identification and RSRP measurement on a frequency different from that of the serving cell.

TABLE 3

MeasGapConfig Field Descriptions
gapOffset
Any one of gp0, gp1, gp2, and gp3 may be set as the value of gapOffset. gp0 corresponds to the gap offset of pattern ID "0" with MGRP=40ms. Gp1 corresponds to the gap offset of pattern ID " 1" with MGRP=80ms. gp2 corresponds to the gap offset of pattern ID "2" with MGRP=40ms and MGL=3ms. gp3 corresponds to the gap offset of pattern ID "3" with MGRP=80ms and MGL=3ms.

TABLE 4

| Gap Pattern Id | Measurement Gap Length: MGL | Measurement Gap Repetition Period: MGRP | Minimum time to perform measurements for inter-frequency and inter-RAT during 480 ms period |
|---|---|---|---|
| 0 | 6 ms | 40 ms | 60 ms |
| 1 | 6 ms | 80 ms | 30 ms |
| 2 | 3 ms | 40 ms | 24 ms |
| 3 | 3 ms | 80 ms | 12 ms |

If the UE requires a measurement gap to identify and measure inter-frequency and inter-RAT cells, the E-UTRAN (i.e. the base station) provides one measurement gap (MG) pattern having a constant gap interval. The UE does not transmit/receive any data from the serving cell during the measurement gap period, and after retuning its RF chain according to the inter-frequency, performs measurement at the corresponding inter-frequency.

<Carrier Aggregation>

A carrier aggregation (CA) system will now be described.

The carrier aggregation system refers to aggregation of a plurality of component carriers (CCs). By such carrier aggregation, the meaning of an existing cell is changed. According to carrier aggregation, a cell may mean a combination of a downlink component carrier and an uplink component carrier, or a single downlink component carrier.

In addition, in carrier aggregation, a cell may be divided into a primary cell, a secondary cell, and a serving cell. A primary cell means a cell operating at a primary frequency, and a cell in which the UE performs an initial connection establishment procedure or a connection re-establishment procedure with a base station, or is indicated as a primary cell in a handover procedure means cell. The secondary cell refers to a cell operating in a secondary frequency, is established once an RRC connection is established, and is used to provide additional radio resources.

As described above, the carrier aggregation system may support a plurality of CCs, that is, a plurality of serving cells, unlike the single carrier system.

Such a carrier aggregation system may support cross-carrier scheduling. Cross-carrier scheduling refers to resource allocation of a PDSCH transmitted through another component carrier through a PDCCH transmitted through a specific component carrier and/or a component other than a component carrier that is basically linked to the specific component carrier. It is a scheduling method capable of allocating resources of PUSCH transmitted through a carrier.

<Introduction of Dual Connectivity (DC)>

Recently, a method for allowing a UE to simultaneously connect to different base stations, for example, a base station of a macro cell and a base station of a small cell, is being studied. This is called double connection (DC).

In DC, an eNodeB for a primary cell (Pcell) may be referred to as a Master eNodeB (hereinafter, referred to as MeNB). In addition, the eNodeB for only the secondary cell (Scell) may be referred to as a secondary eNodeB (hereinafter, referred to as SeNB).

A cell group including a primary cell (Pcell) by the MeNB may be referred to as a master cell group (MCG) or a PUCCH cell group 1, and a cell group including a secondary cell (Scell) by the SeNB may be referred to as a secondary cell group (SCG) or a PUCCH cell group 2.

On the other hand, among the secondary cells in the secondary cell group (SCG), a secondary cell capable of transmitting UCI (Uplink Control Information) or a secondary cell capable of transmitting PUCCH to a UE is a super secondary cell (Super SCell) or a primary secondary cell (PSCell).

<IoT (Internet of Things) Communication>

Meanwhile, the IoT will be described below.

The IoT refers to information exchange between IoT devices without human interaction through a base station or information exchange between an IoT device and a server through a base station. In this way, since IoT communication passes through a cellular base station, it is also called CIoT (Cellular Internet of Things).

Such IoT communication is a type of MTC (Machine Type Communication).

Accordingly, the IoT device may be referred to as an MTC device.

Since IoT communication has a small amount of transmitted data and infrequent transmission and reception of uplink or downlink data, it is desirable to lower the unit price of the IoT device and reduce battery consumption according to a low data rate. In addition, since the IoT device has low mobility, it has a characteristic that the channel environment hardly changes.

As one method for low-cost of the IoT device, regardless of the system bandwidth of the cell, the IoT device may use a subband (subband) of, for example, about 1.4 MHz.

The IoT communication operating on the reduced bandwidth may be referred to as NB (Narrow Band) IoT communication or NB CIoT communication.

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

The ITU proposes three usage scenarios, for example, eMBB (enhanced Mobile BroadBand), mMTC (massive Machine Type Communication) and URLLC (Ultra Reliable and Low Latency Communications).

URLLC relates to usage scenarios that require high reliability and low latency. For example, services such as autonomous driving, factory automation, and augmented reality require high reliability and low latency (e.g. latency of 1 ms or less). Currently, the delay time of 4G (LTE) is statistically 21-43 ms (best 10%) and 33-75 ms (median). This is insufficient to support services requiring latency of less than 1 ms. Next, the eMBB usage scenario relates to a usage scenario requiring mobile ultra-wideband.

That is, the 5th generation mobile communication system may target higher capacity than the current 4G LTE, increase the density of mobile broadband users, and support D2D (Device to Device), high stability, and MTC (Machine type communication). 5G R&D also aims to achieve lower latency and lower battery consumption than 4G mobile communication systems to better realize the Internet of Things. For such 5G mobile communication, a new radio access technology (New RAT or NR) may be proposed.

Figure 4A:
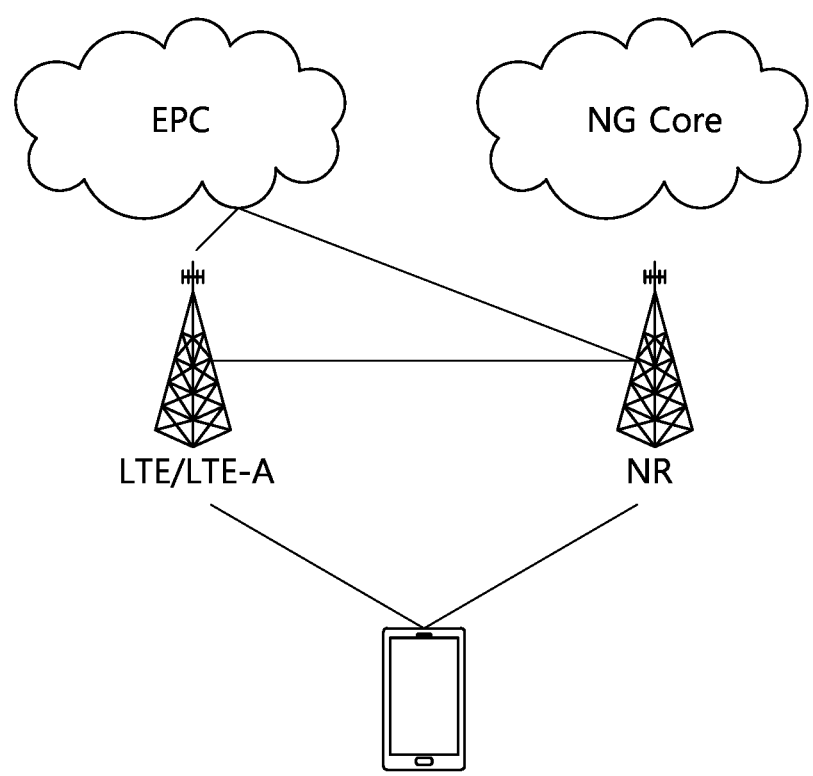
FIGS. 4a to 4c are exemplary diagrams illustrating an exemplary architecture for a service of next-generation mobile communication.
Figure 4B:
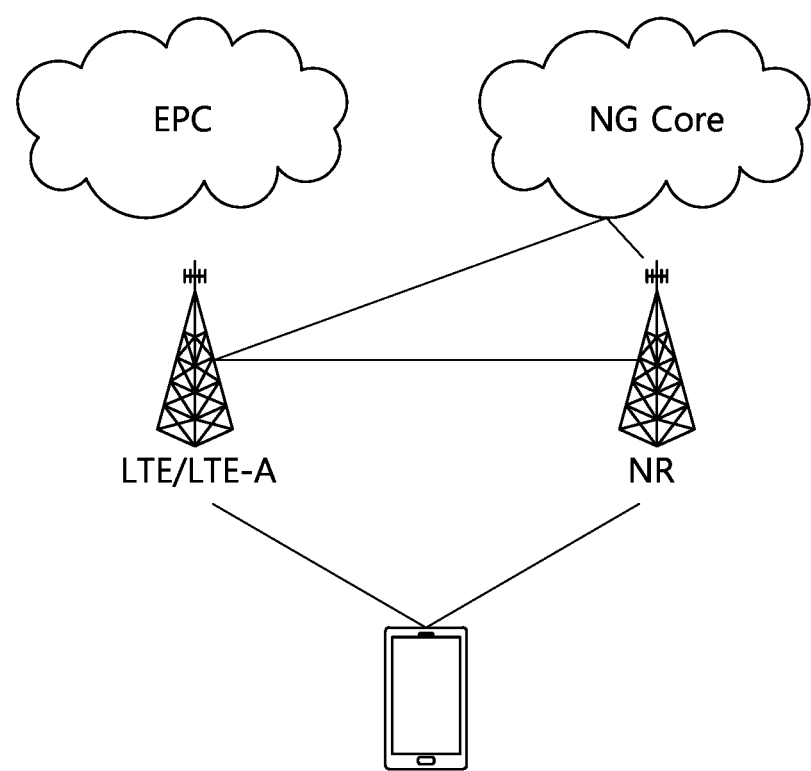
Figure 4C:
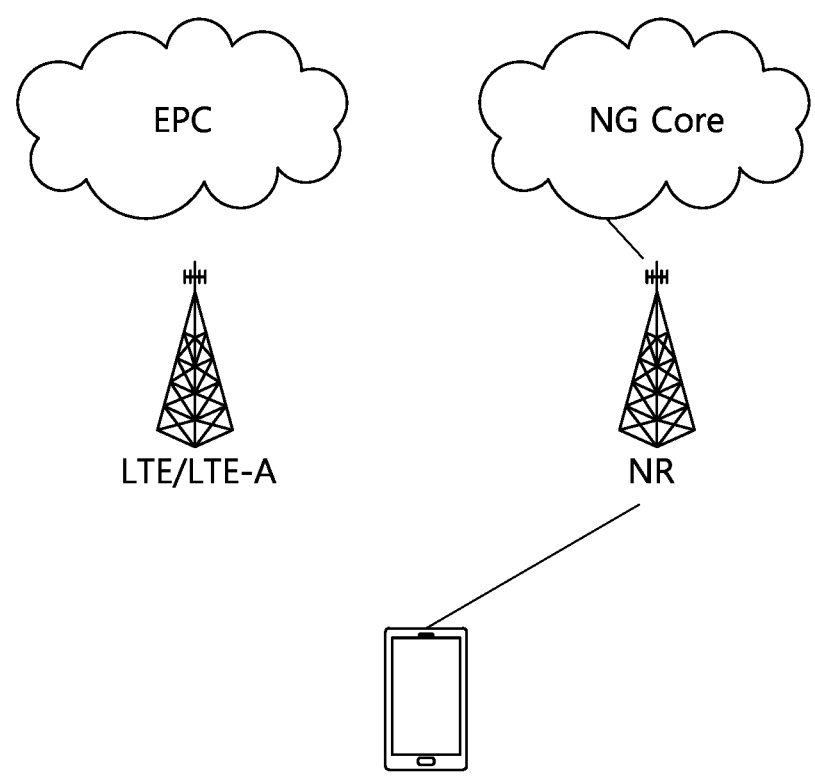

FIGS. 4a to 4c are exemplary diagrams illustrating an exemplary architecture for a service of next-generation mobile communication.

Referring to FIG. 4a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 4b, unlike FIG. 4a, an LTE/LTE-A-based cell is connected to a core network for 5G mobile communication, that is, the LTE/LTE-A-based cell is connected to a Next Generation (NG) core network.

A service method based on the architecture shown in FIG. 4a and FIG. 4b is referred to as NSA (non-standalone).

Referring to FIG. 4c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 5:
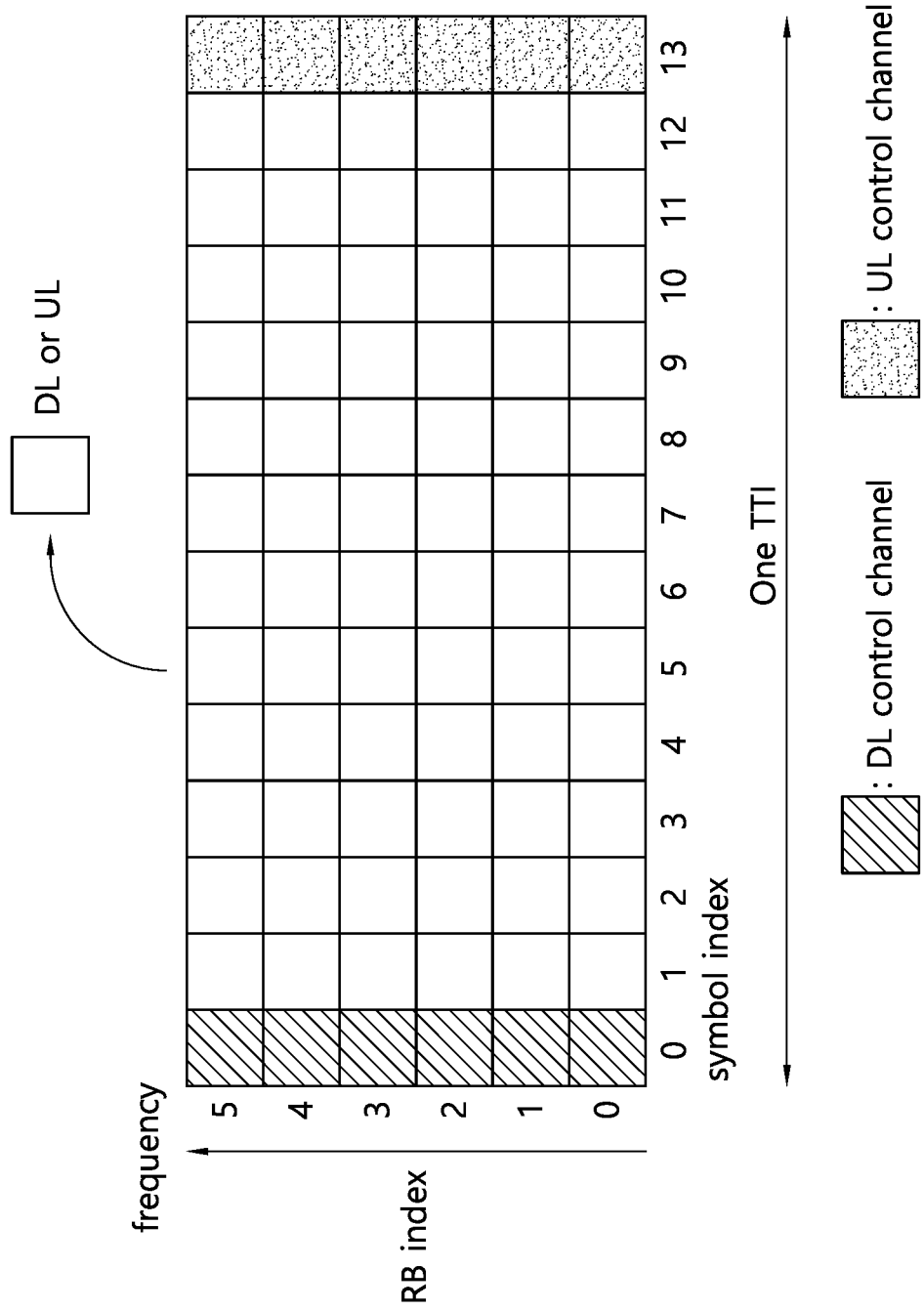
FIG. 5 shows an example of subframe types in NR.

FIG. 5 shows an example of subframe types in NR.

The TTI (transmission time interval) shown in FIG. 5 may be referred to as a subframe or a slot for NR (or new RAT). The subframe (or slot) of FIG. 5 may be used in a TDD system of NR (or new RAT) to minimize data transmission delay. As shown in FIG. 5, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot). The structure of such a subframe (or slot) may be referred to as a self-contained subframe (or slot). When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by p, a subcarrier spacing and a corresponding CP length may be expressed as shown in the following table.

TABLE 5

| M | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by µ, the number of OLDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 6

| µ | $N^{slot}_{symb}$ | $N^{frame, \mu}_{slot}$ | $N^{subframe, \mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by µ, the number of OLDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 7

| M | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 8

| | Symbol Number in Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | X | X | X | X | X |
| 7 | D | D | D | D | D | D | D | X | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | D | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | D | D | D | D | D | X | D | D | X |
| 47 | D | D | D | X | X | D | D | D | D | X | X | D | X | X |
| 48 | D | X | X | X | X | X | D | X | X | X | X | X | X | X |
| 49 | D | X | X | X | X | X | D | X | X | X | X | X | X | X |

TABLE 8-continued

| | Symbol Number in Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 50 | X | U | U | U | U | U | X | U | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | X | X | U | U | D | D | D | X | X | U | U |
| 58 | D | D | X | X | U | U | U | D | D | X | X | U | U | U |
| 59 | D | X | X | U | U | U | U | D | X | X | U | U | U | U |
| 60 | D | X | X | X | X | U | U | D | X | X | X | X | U | U |
| 61 | D | D | X | X | X | U | U | D | D | X | X | X | U | U |

<Operating Band in NR>

The operating band in NR is divided into a frequency range 1 (FR1) band and an FR2 band. The FR1 band means a frequency band of 6 GHz or less, and the FR2 band means a frequency band of more than 6 GHz. FR1 band and FR2 band are defined as shown in Table 9 below.

TABLE 9

| Frequency band designation | Corresponding frequency range |
|---|---|
| Frequency Range 1 (FR 1) | 450 MHz-6000 MHz |
| Frequency Range 2 (FR 2) | 24250 MHz-52600 MHz |

The operating bands in Table 10 below are operating bands converted from the LTE/LTE-A operating band and correspond to the FR1 band.

TABLE 10

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Below Table 11 shows the NR operating bands defined in the high frequency phase, and the operating bands in Table 11 correspond to the FR2 band.

TABLE 11

| NR operation bands | Uplink operation bands $F_{UL\_low}$-$F_{UL\_high}$ | Downlink operation bands $F_{DL\_low}$-$F_{DL\_high}$ | duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

On the other hand, when the operating band of the above table is used, it is used as the channel bandwidth as shown in the following table.

TABLE 12

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above Table 12, SCS means subcarrier spacing. In the above table, NRB indicates the number of RBs. On the other hand, when the operating band of the above table is used, it is used as the channel bandwidth as shown in below Table 13.

TABLE 13

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<CSI-RS>

The CSI-RS is a channel-state information (CSI) reference signal (CSI-Reference Signal). The CSI-RS is a reference signal used when the UE reports to a serving cell related to CSI feedback.

The CSI-RS may be configured by a combination of one or more CSI-RS components. Zero-power CSI-RS and non-zero-power CSI are defined.

For non-zero-power CSI-RS, a sequence is generated according to 7.4.1.5.2 of 3GPP TS 38.211 and mapped to a resource element according to 7.4.1.5.3.

For zero-power CSI-RS, the UE assumes that the resource elements defined in 7.4.1.5.3 of 3GPP TS 38.211 are not used for PDSCH transmission, and makes no assumptions about downlink transmission within these resource elements.

CSI-RS location within the slot

1) Frequency location: The starting subcarrier of the component RE pattern is as follows.

For 1-port CSI-RS, there is no restriction.

for Y=2, limited to one of the even subcarriers.

For Y=4, it is limited to one of subcarriers 0, 4, 8.

Here, Y means an interval at which the start subcarrier is arranged.

2) Time location: Transmitted in 5, 6, 7, 8, 9, 10, 12, 13 OFDM symbols.

Cycle

In NR, the following CSI-RS transmission period is supported.

{5, 10, 20, 40, 80, 160, 320, 640} slots

<NR to SS Block>

SS block (SS/PBCH block: SSB) is information necessary for the terminal to perform initial access in 5G NR, that is, a physical broadcast channel (PBCH) including a master information block (MIB) and a synchronization signal (Synchronization Signal: SS) (PSS and SSS).

In addition, a plurality of SSBs may be bundled to define an SS burst, and a plurality of SS bursts may be bundled to define an SS burst set. It is assumed that each SSB is beamformed in a specific direction, and several SSBs in the SS burst set are designed to support terminals existing in different directions, respectively.

Figure 6A:
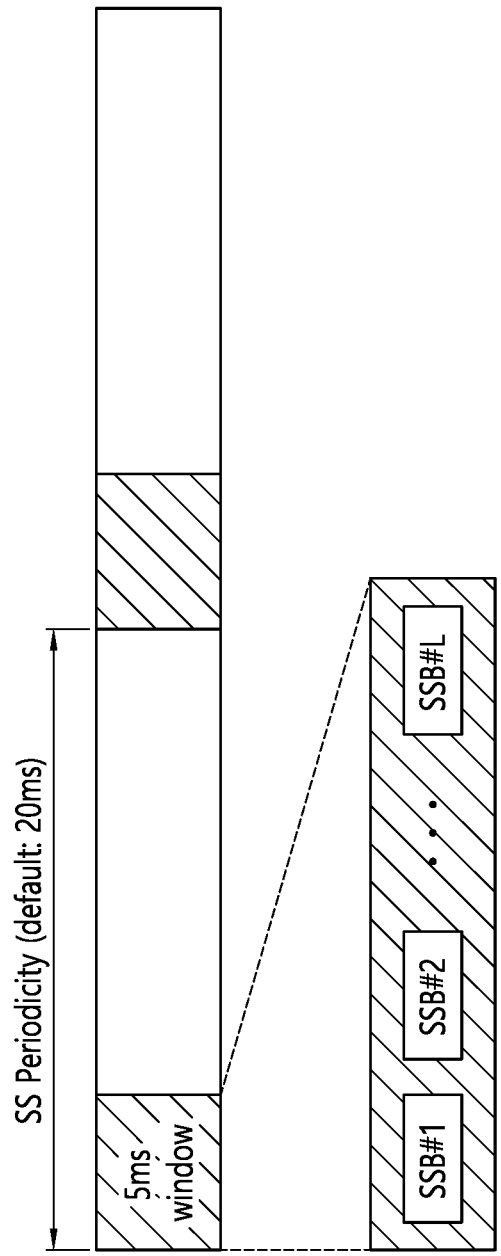

FIGS. 6a and 6b are exemplary views showing the structure of SSB in NR.

Referring to FIGS. 6a and 6b, the SSBs in the SS burst may be transmitted within a window of 5 ms length regardless of the period of the SS burst set. Within the 5 ms window, the number of possible candidates in which the SSB may be located may be L.

For various frequency bands, the maximum number L of SSBs in an SS burst set may be as in the following example. (For reference, it is assumed that the minimum number of SSBs in each SS burst set is 1 to define a performance requirement)

Frequency band below 3 GHz: L=4

3 GHz~6 GHZ frequency band: L=8

6 GHz~52.6 GHz frequency band: L=64

And, as shown in FIG. 6a, the SSB period may be 20 ms. Specifically, a default value for initial cell selection may be 20 ms. And, in RRC CONNECTED/RRC IDLE and NSA, the SSB period may be, for example, one of {5, 10, 20, 40, 80, 160}ms.

FIG. 6b shows an example of SSB configuration within a 5 ms window. Referring to FIG. 6b, an example of SSB according to subcarrier spacing (SCS) and an L value in each SCS is shown. In FIG. 6b, two SSBs may be located in each colored area. For example, when L=4 in 15 kHz SCS, two SSBs are respectively located in two colored areas, so that a total of four SSBs can be transmitted in a 5 ms window. As another example, when L=64 in 240 kHZSCS, each SSB is located in 32 colored areas, so that a total of 64 SSBs can be transmitted in a 5 ms window.

Time-Frequency Structure of an SS/PBCH Block

In the time domain, the SSB may consist of 4 OFDM symbols. Here, the four OFDM symbols may be numbered from 0 to 3 in ascending order within the SSB. Within SSB, PSS, SSS and PBCH (related to DM-RS) may use OFDM symbols.

In the frequency domain, the SSB may include 240 consecutive subcarriers. Here, subcarriers may be numbered from 0 to 239 in the SSB. It is assumed that k is a frequency index, l is a time index, and k and l may be defined in one SSB.

The UE may assume that a resource element indicated by "set to 0" in the example of Table 14 is set to 0. Subcarrier 0 in the SSB may correspond to the subcarrier k0 of a common resource block $N^{SSB}_{CRB}$. Here, the $N^{SSB}_{CRB}$ may be obtained by the UE through higher layer signaling. For example, the $N^{SSB}_{CRB}$ may be obtained from a higher-layer parameter offset-ref-low-scs-ref-PRB. Any common resource block partially or entirely overlapped with the SSB may be viewed as occupied or not used for transmission of the PDSCH or PDCCH. A resource element that is not used for SSB transmission but is part of a partially overlapping common resource may be assumed to be set to 0.

For SSB, the UE can estimate the following.
Antenna port p-4000
The same CP length and SCS may be used for PSS, SSS and PBCH.
for a specific SSB type (e.g., SSB type A), $k0 \in \{0, 1, 2, \ldots, 23\}$, $\mu \in \{0, 1\}$, and NSSBCRB may be expressed in units of 15 kHz SCS.
for a specific SSB type (e.g., SSB type B), $k0 \in \{0, 1, 2, \ldots, 11\}$, $\mu \in \{3, 4\}$, and NSSBCRB may be expressed in units of 60 kHz SCS.

The UE determines that the SSB transmitted with the same block index is QCL for Doppler spread, Doppler shift, average gain, average delay, and spatial Rx parameters (Doppler spread, Doppler shift, average gain, average delay, and spatial Rx parameters). (quasi co-located). The UE may not assume QCL for other SSB transmissions.

Table 14 below shows examples of resources in SSB for PSS, SSS, PBCH and DM-RS for PBCH in SSB.

TABLE 14

| channel or signal | number of OFDM symbols for the starting point of SSB: l | Number of subcarriers for the starting point of SSB: k |
|---|---|---|
| PSS | 0 | 56, 57, ..., 182 |
| SSS | 2 | 56, 57, ..., 182 |
| Set to 0 | 0 | 0, 1, ..., 55, 183, 184, ..., 236 |
|  | 2 | 48, 49, ..., 55, 183, 184, ..., 191 |
| PBCH | 1, 3 | 0, 1, ..., 239 |
|  | 2 | 0, 1, ..., 47, 192, 193, ..., 239 |
| DM-RS for PBCH | 1, 3 | 0 + v, 4 + v, 8 + v, ..., 236 + v |
|  | 2 | 0 + v, 4 + v, 8 + v, ..., 44 + v 192 + v, 196 + v, ..., 236 + v |

Figure 7:
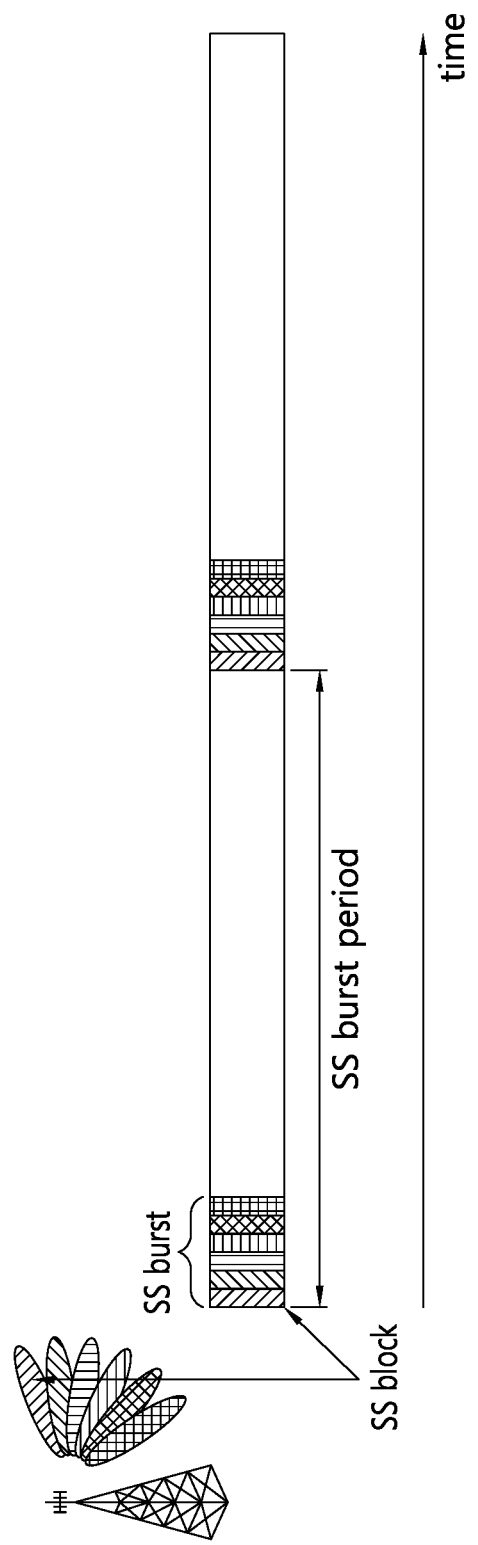
FIG. 7 is an exemplary diagram illustrating an example of SSB in NR.

FIG. 7 is an exemplary diagram illustrating an example of SSB in NR.

Referring to FIG. 7, the SS burst is transmitted every predetermined period. Accordingly, the terminal receives the SSB, and performs cell detection and measurement.

Meanwhile, in 5G NR, beam sweeping is performed for the SSB. This will be described with reference to FIG. 8.

Figure 8:
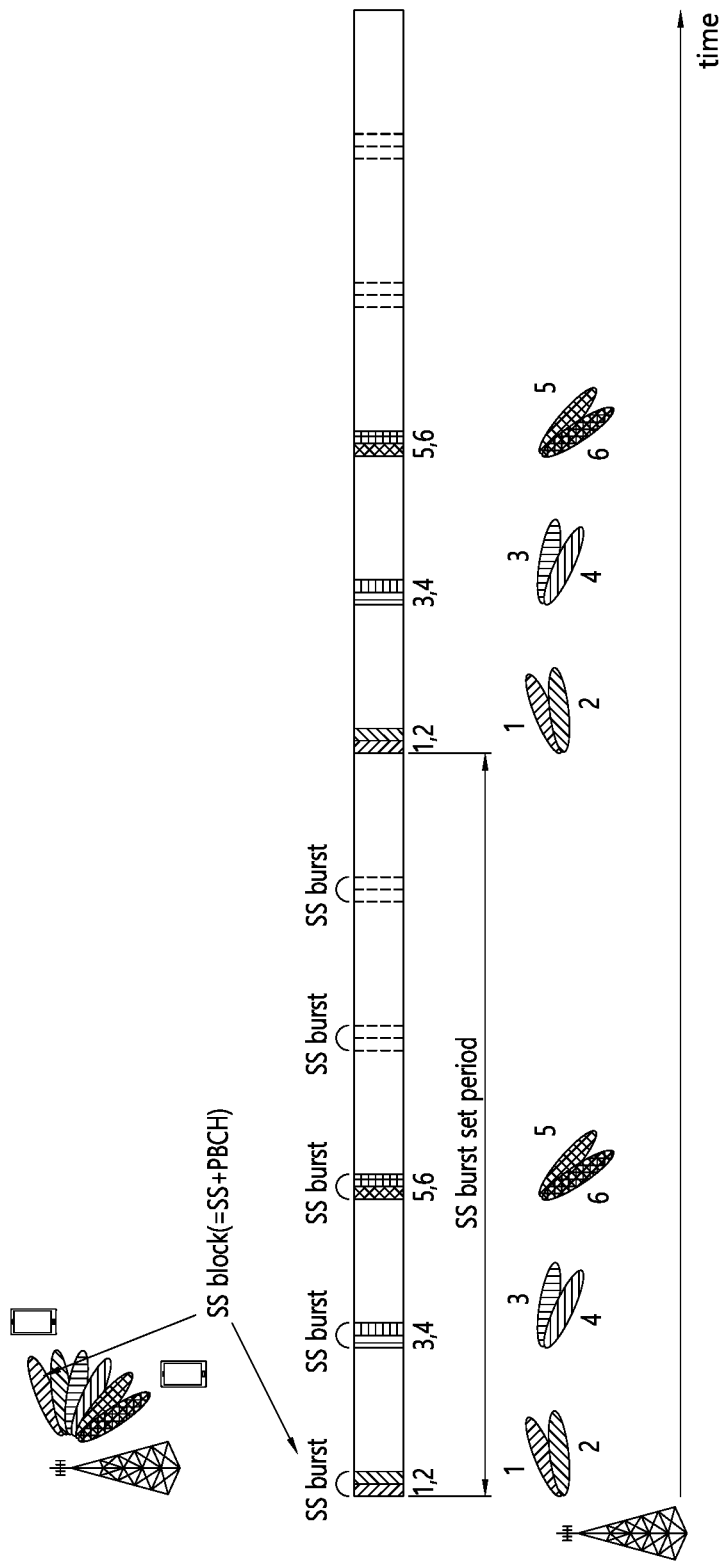
FIG. 8 is an exemplary diagram illustrating an example of beam sweeping in NR.

FIG. 8 is an exemplary diagram illustrating an example of beam sweeping in NR.

The base station transmits each SSB in the SS burst while performing beam sweeping according to time. At this time, several SSBs in the SS burst set are transmitted to support terminals existing in different directions, respectively. In FIG. 6, an SS burst set includes SSBs 1 to 6, and each SS burst includes two SSBs.

Figure 9:
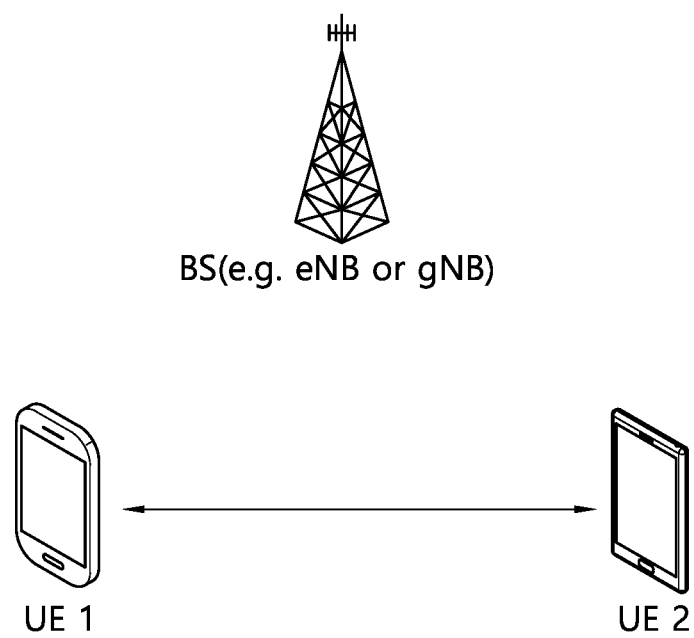
FIG. 9 shows UE performing V2X or SL communication, according to an embodiment of the present disclosure.

FIG. 9 shows UE performing V2X or SL communication, according to an embodiment of the present disclosure.

The embodiment of FIG. 9 may be combined with various embodiments of the present disclosure.

Referring to FIG. 9, the term of UE in V2X or SL communication may mainly refer to a user's terminal. However, when network equipment such as a base station transmits and receives signals according to a communication method between UEs, the base station may also be regarded as a kind of UE. For example, UE 1 may be the first apparatus 100, and UE 2 may be the second apparatus 200.

For example, UE 1 may select a resource unit corresponding to a specific resource from a resource pool indicating a set of a series of resources. And, UE 1 may transmit an SL signal using the resource unit. For example, UE 2, which is a receiving UE, may receive a resource pool configured for UE 1 to transmit a signal, and may detect a signal of UE 1 in the resource pool.

Here, if the UE 1 is within the connection range of the base station, the base station may inform the UE 1 of the resource pool. On the other hand, if the UE 1 is outside the connection range of the base station, another UE informs the UE 1 of the resource pool, or the UE 1 may use a pre-configured resource pool.

In general, the resource pool may be composed of a plurality of resource units, and each UE may select one or a plurality of resource units to use for its own SL signal transmission.

Hereinafter, resource allocation in the SL will be described.

Figure 10:
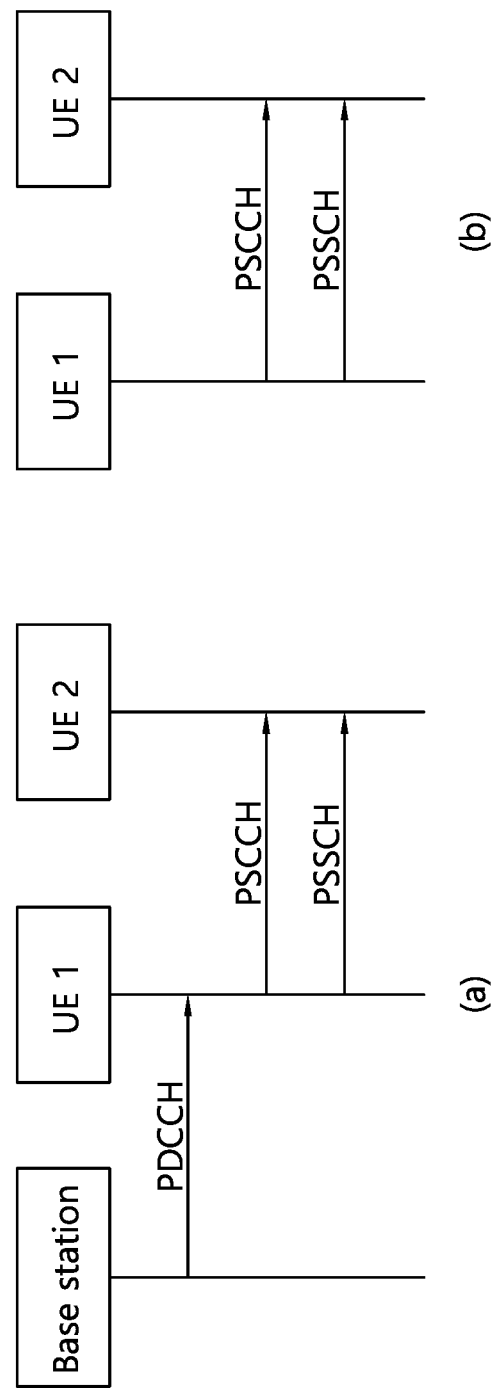
FIG. 10 illustrates a procedure for UE to perform V2X or SL communication according to a transmission mode, according to an embodiment of the present disclosure.

FIG. 10 illustrates a procedure for UE to perform V2X or SL communication according to a transmission mode, according to an embodiment of the present disclosure.

The embodiment of FIG. 10 may be combined with various embodiments of the present disclosure. In various embodiments of the present disclosure, the transmission mode may be referred to as a mode or a resource allocation mode. Hereinafter, for convenience of description, a transmission mode in LTE may be referred to as an LTE transmission mode, and a transmission mode in NR may be referred to as an NR resource allocation mode.

For example, FIG. 10(a) shows UE's operation related to LTE transmission mode 1 or LTE transmission mode 3. Or, for example, FIG. 10(a) shows UE's operation related to NR resource allocation mode 1. For example, LTE transmission mode 1 may be applied to general SL communication, and LTE transmission mode 3 may be applied to V2X communication.

For example, FIG. 10(b) shows UE's operation related to LTE transmission mode 2 or LTE transmission mode 4. Or, for example, FIG. 10(b) shows UE's operation related to NR resource allocation mode 2.

Referring to FIG. 10(a), in LTE transmission mode 1, LTE transmission mode 3 or NR resource allocation mode 1, the base station may schedule an SL resource to be used by the UE for SL transmission. For example, the base station may perform resource scheduling to UE 1 through PDCCH (more specifically, downlink control information (DCI)), and UE 1 may perform V2X or SL communication with UE 2 according to the performed resource scheduling. For example, UE 1 may transmit SCI (Sidelink Control Information) to UE 2 through a Physical Sidelink Control Channel (PSCCH), and then may transmit data based on the SCI to UE 2 through a Physical Sidelink Shared Channel (PSSCH).

Referring to FIG. 10(b), in LTE transmission mode 2, LTE transmission mode 4 or NR resource allocation mode 2, the UE may determine the SL transmission resource within the SL resource configured by the base station/network or the pre-configured SL resource. For example, the SL resource configured by the base station/network or the pre-configured SL resource may be a resource pool. For example, the UE may autonomously select or schedule a resource for SL transmission. For example, the UE may perform SL communication by selecting a resource by itself within a configured resource pool. For example, the UE may select a resource by itself within the selection window by performing a sensing and resource (re)selection procedure. For example, the sensing may be performed in unit of subchannel. In addition, UE 1, which has selected a resource within the resource pool, may transmit the SCI to UE 2 through the PSCCH, and may transmit data based on the SCI to UE 2 through the PSSCH.

Figure 11:
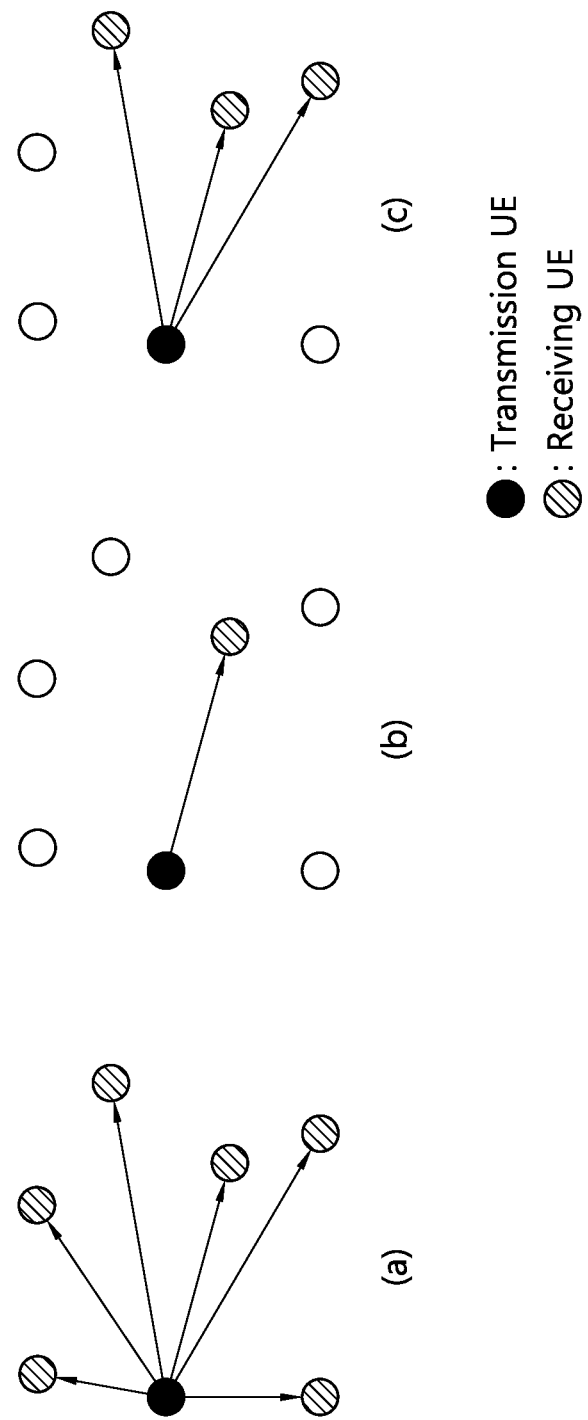
FIG. 11 illustrates three types of casts according to an embodiment of the present disclosure.

FIG. 11 illustrates three types of casts according to an embodiment of the present disclosure.

The embodiment of FIG. 11 may be combined with various embodiments of the present disclosure. Specifically, FIG. 11(*a*) shows broadcast type SL communication, FIG. 11(*b*) shows unicast type SL communication, and FIG. 11(*c*) shows groupcast type SL communication. In the case of unicast type SL communication, the UE may perform one-to-one communication with another UE. In the case of groupcast type SL communication, the UE may perform SL communication with one or more UE in a group to which the UE belongs. In various embodiments of the present disclosure, SL groupcast communication may be replaced with SL multicast communication, SL one-to-many communication, or the like.

Hereinafter, SL (sidelink) congestion control will be described.

When the UE determines the SL transmission resource by itself, the UE also determines the size and frequency of the resource used by the UE by itself. Of course, the use of a resource size or frequency above a certain level may be restricted due to a constraint from a network or the like. However, if all UEs use a relatively large number of resources in a situation in which many UEs are clustered in a specific area at a specific point in time, the overall performance may be greatly deteriorated due to mutual interference.

Therefore, the UE needs to observe the channel condition. If the UE determines that excessively many resources are being consumed, it is desirable for the UE to take an action in the form of reducing its own resource use. In this specification, this may be defined as congestion control (CR). For example, the UE may determine whether the energy measured in the unit time/frequency resource is above a certain level, and may control the amount and frequency of its transmission resource according to the ratio of the unit time/frequency resource in which the energy of the predetermined level or more is observed. In this specification, a ratio of time/frequency resources in which energy of a certain level or higher is observed may be defined as a channel congestion ratio (CBR). The UE may measure CBR for a channel/frequency. Additionally, the UE may transmit the measured CBR to the network/base station.

III. Disclosure of the Present Specification

The disclosures described below in this specification may be implemented in one or more combinations. Each of the drawings shows an embodiment of each disclosure, but the embodiments of the drawings may be implemented in combination with each other. The disclosures described below may be implemented in one or more combinations. It may consist of a combination of one or more of the following actions/configurations/steps. For reference, user equipment (UE) and a terminal are mixed and described.

The proposed method may be applicable to various services, such as eMBB, V2X, Public Safety, and IoT. PC5 may refer to only NR PC5, or may refer to both NR PC5 and LTE PC5. NG-RAN may refer to only gNB, or may refer to both gNB and ng-eNB.

The following drawings were created to explain a specific example of the present specification. The names of specific devices described in the drawings or the names of specific signals/messages/fields are presented by way of example, so that the technical features of the present specification are not limited to the specific names used in the following drawings.

UE device (smartphone, car, robot, etc.) supporting sidelink communication transmits a signal through a given resource (e.g., resource pool, BWP, etc.) to transmit data. In this case, the UE allocates resources for signal transmission. At this time, the terminal measures the strength of signals transmitted by neighboring terminals (e.g., RSSI, RSRP, etc.), allocates resources in consideration of interference, etc., and transmits signals through the allocated resources. For example, it has a sensing window for measuring a reference signal received power (RSRP) or a received signal strength indicator (RSSI) for 1 second before the UE selects a resource to transmit a signal. The terminal senses a resource capable of signal transmission through RSRP or RSSI measured during the sensing window period, determines a set of transmittable resources, and after the sensing window period ends, the signal is transmitted during the selection window period. Select or reselect a resource. Here, the sensing window refers to a period in which the UE measures RSRP/RSSI for a resource before transmitting a signal to select a resource for signal transmission. In addition, the selection window refers to a section in which a final resource is selected or reselected from among candidate resources selected in the sensing window after the sensing window.

Figure 12:
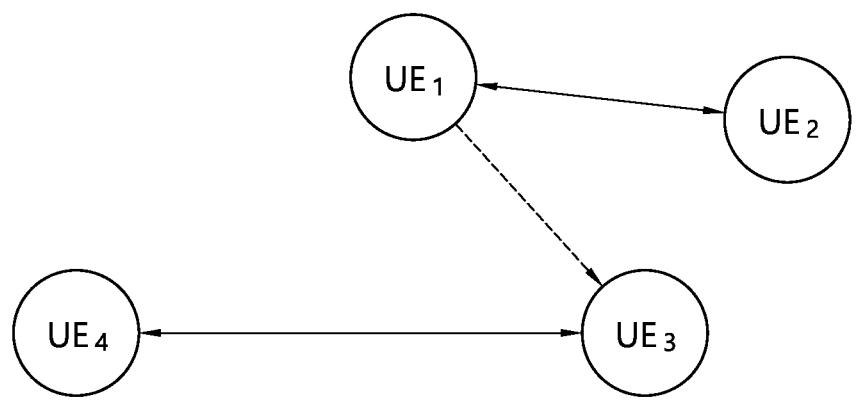
FIG. 12 is an exemplary diagram illustrating an example of interference in sidelink communication of UE.

FIG. 12 is an exemplary diagram illustrating an example of interference in sidelink communication of UE.

UE1 and UE2 may communicate via sidelink. Also, UE3 and UE4 may communicate through sidelinks. In this case, if the resource used for communication between UE1-UE2 and the resource used for communication between UE3-UE4 are the same, interference may occur. For example, therefore, UE3 may measure the signal strength (e.g., RSRP, RSSI, etc.) of neighboring UEs with respect to the resource prior to resource allocation for signal transmission. In this case, the signal that UE3 transmits to UE4 may interfere with communication between UE1 and UE2. Resource allocation is performed in consideration of the RSRP and RSSI. However, in this case, the RSRP and RSSI are based on assuming that a neighboring UE (e.g., UE1) always transmits a signal with maximum transmission power. That is, when the UE allocates resources, it is assumed that the neighboring UE (e.g., UE1) always transmits a signal with maximum power.

However, in actual communication between specific UEs such as unicast or group-cast, the UE may transmit a signal by performing power control for adjusting transmission power. In this case, whether UE performs the power control or not affects the interference to the neighboring UE and how much UE performs the power control affects the interference to the neighboring UE.

Figure 13:
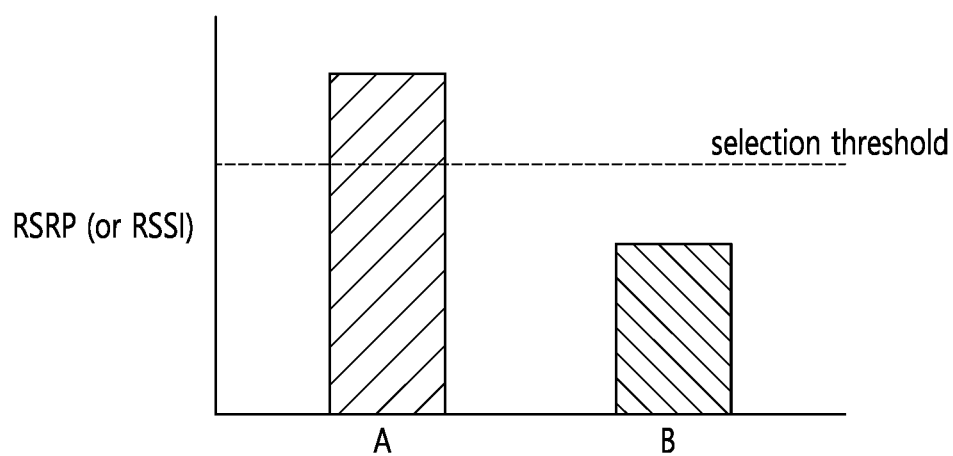
FIG. 13 is an exemplary diagram illustrating an example of resource allocation for signal transmission.

FIG. 13 is an exemplary diagram illustrating an example of resource allocation for signal transmission.

The UE selects a resource in transmitting a signal, and when selecting a specific resource, the UE should consider interference by a neighboring UE with respect to the specific resource. When the interference is large, the UE may determine that signal transmission using a specific resource is impossible, and may select another resource. On the other hand, when the interference is small, the UE may determine signal transmission with specific resource and may transmit signal. As described above, a criterion for the magnitude of interference may be configured for each UE. A selection threshold may be such a criterion. The UE may measure interference with respect to a specific resource, and when the measured value is less than a selection threshold, the UE may select a specific resource and use it for signal transmission.

UE3 in FIG. 12 may measure RSRP (or RSSI) for UE1 for resource allocation (e.g., resource allocation for communication with UE4) as described above.

The example shown in FIG. 13 shows an example in which UE3 measures a signal of UE1 for a specific resource. Case A is an example of RSRP (or RSSI) measured by UE3 when UE1 transmits a signal at maximum transmission power without performing power control, and case B is an example of RSRP (or RSSI) measured by UE3 when UE1 transmits a signal with maximum transmission power by power control. In the case of A, since the measured RSRP (or RSSI) value is above the selection threshold, UE3 cannot select the corresponding resource. However, in the case of B, since the measured RSRP (or RSSI) value is less than a selection threshold, UE3 may select a corresponding resource. The selection threshold may be, for example, −100 dBm.

That is, when UE3 considers power control performed by UE1 (i.e., case B), UE3 may transmit a signal using the corresponding resource. However, when UE3 doesn't consider power control performed by UE1 (i.e., case A), it is assumed that UE1 transmits a signal with maximum power, so UE3 cannot use the corresponding resource.

In addition, if only the power control of UE1 is considered, the following problems may occur. A delta value, which will be described later, corresponds to a power value reduced from the maximum transmission power due to power control. For example, delta_P3 corresponds to a value obtained by subtracting the power value actually transmitted by the UE3 from the maximum transmission power of the UE3. Also, delta_P1 corresponds to a value obtained by subtracting the power value actually transmitted by the UE1 from the maximum transmission power of the UE1. And $RSRP_{13}$ corresponds to a value measured by UE3 for a signal transmitted by UE1.

i) When Delta_P3 is Less than Delta_P1

If $RSRP_{13}$ is lower than the selection threshold which is a criterion for selecting a resource, UE3 may select the resource used by UE1. However, since the delta_P3 value is relatively smaller than that of delta_P1, the power transmitted by the UE3 may be relatively close to the maximum transmission power compared to the UE1. In this case, for example, if the maximum transmission power of the UE3 and the UE1 is the same, the transmit power of the UE3 may be greater than the transmit power of the UE1. Then, since the transmit power of the UE3 is greater than the transmit power of the UE1, the interference that the UE3 gives to the UE1 may increase. This may result in deterioration of reception performance of UE1.

ii) When Delta_P3 is Greater than Delta_P1

If the $RSRP_{13}$ value for a specific resource is greater than the selection threshold, UE3 may exclude the specific resource used by UE1 from communication with UE4. However, since the delta_P3 value is relatively larger than that of delta_P1, the power transmitted by the UE1 may be relatively close to the maximum transmission power compared to the UE3. In this case, for example, if the maximum transmission power of UE3 and UE1 is the same, the transmit power of UE3 may be relatively smaller than that of UE1. Then, the signal with low transmission power from the UE3 may have insignificant interference to the UE1. In this case, if the UE3 does not consider the transmission power even though the UE3 can select the resource used by the UE1 to transmit the signal, the opportunity for the UE3 to select the resource is reduced.

If UE3 transmits a signal with a higher power than the maximum transmission power or the transmission power of UE1, the signal from UE3 may affect UE1 as an interference signal and may also affect other UEs using the corresponding resource. In addition, if the transmit power of UE3 is low, even if the RSRP measured from UE1 is as high as A in FIG. 13, the interference effect on the corresponding resource may be small. That is, in this case, even if UE3 uses the corresponding resource by selecting the corresponding resource, interference by UE3 in the UE1 may be small. When UE3 is able to select a corresponding resource, the chance of selecting a transmission resource may increase.

Therefore, if the UE does not consider the power control of itself (UE3) and the neighboring UE (UE1) when selecting a resource, case that the UE3 increases the interference to the UE1 and case that the resource is wasted due to inability to use the available resources may occur. Therefore, it is necessary to improve the existing resource selection process in consideration of power control.

Figure 14:
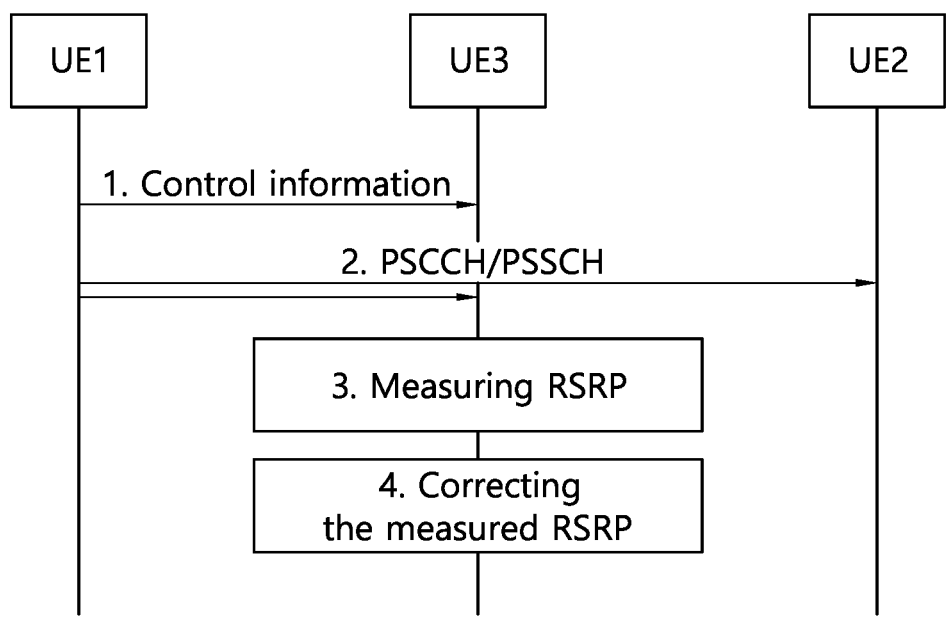
FIG. 14 is an exemplary view showing an example of the first disclosure of the present specification.

FIG. 14 is an exemplary view showing an example of the first disclosure of the present specification.

1) UE3 may receive control information from the neighboring UE (UE1).

The control information may include information of a demodulation reference signal (DMRS). Furthermore, the control information may include information on whether the UE1 performs power control, the power lowered based on the maximum transmission power by the power control (delta_P1), and/or the transmission power level. Also, the control information may include location information of UE1. The delta_P1 may be configured in units of (dB) as shown in Table 15.

TABLE 15

| Index | Delta_P (dB) |
|---|---|
| 1 | 2 |
| 2 | 4 |
| 3 | 6 |
| 4 | 8 |

Referring to Table 15, Index means a distinguishable index. Delta_P means a reduced power value based on the maximum transmission power by power control. For example, the control information received by UE3 may be the form of an Index in the example of Table 15, which means power (delta_P1) lowered by power control based on the maximum transmission power of UE1. Index 2 may mean that the power (delta_P) lowered by the power control corresponds to 4 dB. For example, if the value of delta_P1 is 4 dB, the UE1 transmits a signal with a power 4 dB lower than its maximum transmission power. That is, RSRP measured by UE3 may be smaller than the RSRP calculated based on the maximum transmission power.

2) UE3 may receive a Physical Sidelink Shared Channel (PSSCH) and/or a Physical Sidelink Control Channel (PSCCH) including DMRS from UE1.

3) UE3 may measure $RSRP_{13}$ (PSSCH-RSRP, PSCCH-RSRP) based on DMRS information of the received control information, and DMRS included in PSSCH and/or PSCCH.

4) UE3 corrects the RSRP measured based on i) the power lowered by power control based on the maximum transmission power of UE1 (delta_P1) and ii) the power lowered by power control based on the maximum transmission power of UE3 (delta_P3). Then, UE3 may determine an effective RSRP value (Effective_RSRP$_{13}$). Effective_RSRP13 may be calculated as follows.

$$\text{Effective\_RSRP}_{13} = \text{RSRP}_{13} + (\text{delta\_}P1 - \text{delta\_}P3) + x$$

x is an offset value and may be given down from the network to the UE or may be pre-configured in the UE. x may be used to adjust the Effective_RSRP$_{13}$ value. For example, it may be configured to (0, 0.5, 1, 1.5, 2 dB) in units of 0.5 dB.

UE3 may calculate the RSRP assuming that UE1 transmits a signal with maximum power. According to the degree of power control included in the control information, UE3 may correct the calculated RSRP to an effective RSRP. A selection threshold may be corrected based on the degree of power control. That is, depending on the degree of power control, whether the target to be corrected is RSRP or the selection threshold is a matter of choice, so the same effect and result may be obtained. That is, instead of changing the RSRP value, a method of changing the selection threshold based on the degree of power control may also be possible. This will be described later in FIG. 15.

If the control information includes only whether UE perform the power control or not, Effective_RSRP$_{13}$ may be obtained in a manner similar to the above equation assuming delta_P1 as a constant value.

The control information may include location information of UE1. If there is no power control information in the control information and the UE3 knows the location information of the UE1, the UE3 may predict the pathloss of the signal from the UE1 based on the location information of the UE1. By reflecting the predicted pathloss, an effective RSRP value may be obtained as follows.

$$\text{Effective\_RSRP}_{13} = \text{RSRP}_{13} + (P_{max} - (\text{RSRP}_{13} + \text{expected\_pathloss}) - \text{delta\_}P3) + x$$

Effective_RSRP$_{13}$ indicates effective RSRP. $P_{max}$ represents the maximum transmission power of the UE, and RSRP$_{13}$ represents the strength of a signal from UE1 measured by UE3. expected_pathloss is a value which UE3 predicts signal loss from UE1 based on location information of UE1.

Figure 15:
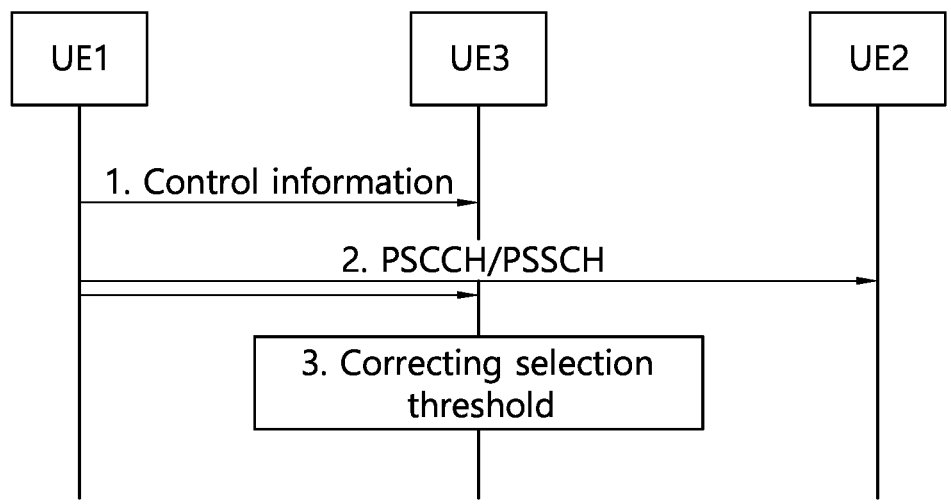
FIG. 15 is an exemplary view showing an example of the second disclosure of the present specification.

FIG. 15 is an exemplary view showing an example of the second disclosure of the present specification.

Steps 1) and 2) are the same as described in FIG. 14.

3) UE3 may correct selection threshold value configured in UE3 based on i) delta_P1 (the power lowered by the power control based on the maximum transmission power of UE1) and ii) delta_P3 (the power lowered by the power control based on the maximum transmission power of UE3).

Figure 16:
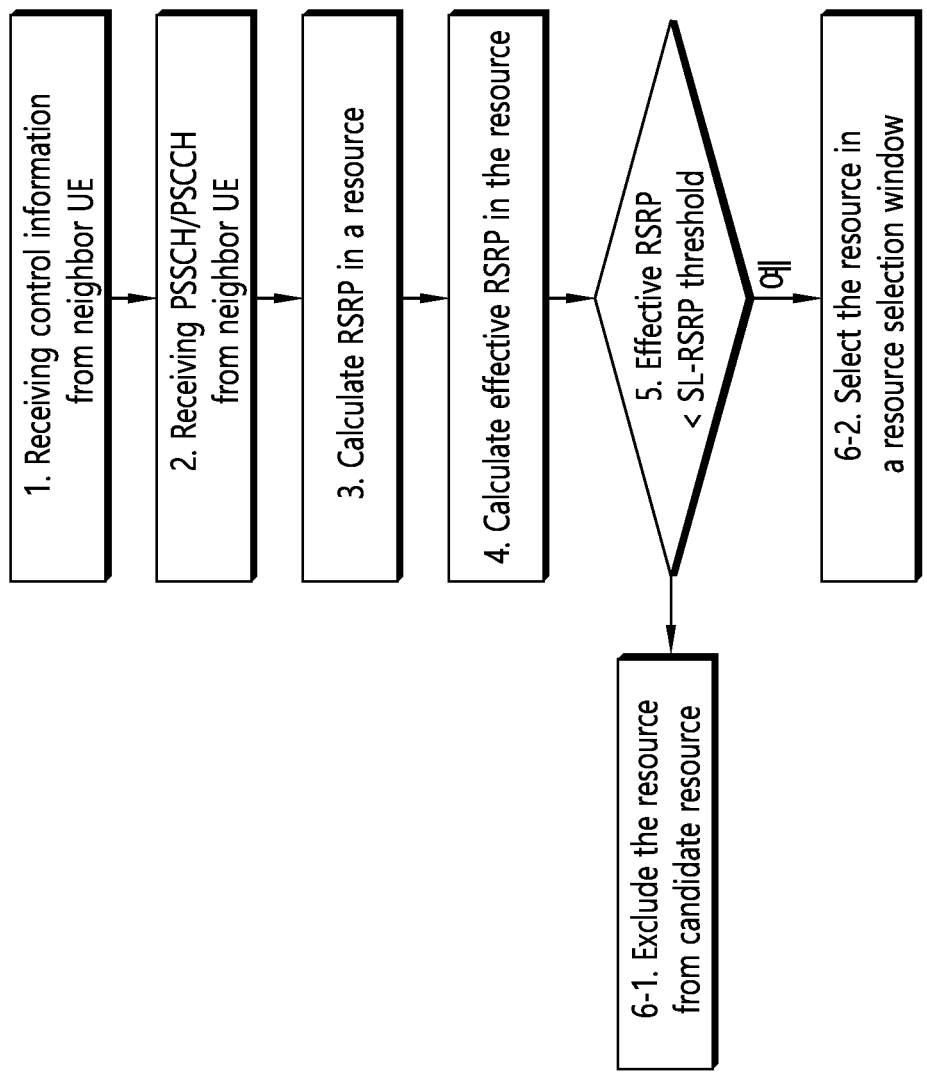
FIG. 16 is an exemplary diagram illustrating a resource allocation procedure according to the disclosure of the present specification.

FIG. 16 is an exemplary diagram illustrating a resource allocation procedure according to the disclosure of the present specification.

FIG. 16 describes a procedure performed by UE3 in FIGS. 14 and 15.

1) UE3 may receive control information from the neighboring UE (UE1). The control information may include information of a demodulation reference signal (DMRS). Furthermore, the control information may include information on i) whether the UE1 perform power control, ii) delta_P1 (the power lowered based on the maximum transmission power by the power control), and/or iii) the transmission power level. Also, the control information may include location information of UE1.

2) UE3 may receive PSSCH/PSCCH including DMRS from UE1.

3) UE3 may measure (or calculate) RSRP$_{13}$ (e.g., PSSCH-RSRP and/or PSCCH-RSRP) based on DMRS information, PSSCH and PSCCH of the received control information.

4) UE3 may corrects the measured RSRP based on delta_P1 and delta_P3 and may calculate an effective RSRP value (Effective_RSRP$_{13}$).

A method of obtaining an effective RSRP value may be as follows, as described with reference to FIG. 14.

$$\text{Effective\_RSRP}_{13} = \text{RSRP}_{13} + (\text{delta\_}P1 - \text{delta\_}P3) + x$$

5) UE3 may compare the effective RSRP value and the selection threshold (SL-RSRP threshold) value.

The selection threshold (SL-RSRP threshold) may have the same function as the selection threshold described with reference to FIG. 14. That is, UE3 may determine whether to select a specific resource as a resource required for signal transmission to UE4 based on a selection threshold (SL-RSRP threshold).

If the effective RSRP value is greater than the selection threshold, step 6-1) may be performed, and if the effective RSRP value is smaller than the selection threshold, step 6-2) may be performed.

6-1) If the effective RSRP value is greater than the selection threshold, the UE3 may exclude a specific resource from the list of candidate resources for signal transmission. Here, the candidate resource list refers to a list of resources whose RSRP of resources measured in the resource pool is smaller than the selection threshold.

6-2) If the effective RSRP value is less than the selection threshold, UE3 may select a specific resource as a candidate resource for signal transmission.

In this step, UE3 may measure the effective RSRP value during the sensing window, and may select as the final resource for signal transmission during the resource selection window from the candidate resource list, which are resources smaller than the selection threshold, and may perform signal transmission using the resource.

Furthermore, through the above method, UE4 may also select a transmission/reception resource candidate in consideration of effective RSRP (effective_RSRP), and by sharing resource candidate information with UE3, a common or optimized resource among the resource candidates selected by UE3 may finally selected, communication between UE3 and UE4 may be performed through the selected resource.

For reference, the operation of UE described in this specification may be implemented by the apparatus of FIGS. 17 to 21 to be described below. For example, the UE may be the first device 100$a$ or the second device 100$b$ of FIG. 17. For example, the operation of the terminal described in this specification may be processed by one or more processors 1020$a$ or 1020$b$. The operations of the UE described herein may be stored in one or more memories 1010$a$ or 1010$b$ in the form of instructions/programs (e.g. instructions, executable code) executable by one or more processors 1020$a$ or 1020$b$. One or more processors 1020$a$ or 1020$b$ control one or more memories 1010$a$ or 1010$b$ and one or more transceivers 1031$a$ or 1031$b$, and execute instructions/programs stored in one or more memories 1010$a$ or 1010$b$ as disclosed herein. It is possible to perform the operation of the terminal (e.g., UE) described in disclosure of this specification.

In addition, the instructions for performing the operation of the terminal described in the disclosure of the present specification may be stored in a non-volatile computer-readable storage medium in which it is recorded. The storage medium may be included in one or more memories 1010$a$ or 1010$b$. In addition, the instructions recorded in the storage medium may be executed by one or more processors 1020$a$ or 1020b to perform the operation of the terminal described in the disclosure of the present specification.

For reference, the operation of the terminal described in this specification may be implemented by the apparatus of FIGS. 17 to 21 to be described below. For example, the network node may be the first device 100a or the second device 100b of FIG. 17. For example, the operation of the network node described herein may be processed by one or more processors 1020a or 1020b. The operations of the network node or base station described herein may be stored in one or more memories 1010a or 1010b in the form of instructions/programs (e.g. instruction, executable code) executable by one or more processors 1020a or 1020b. One or more processors 1020a or 1020b control one or more memories 1010a or 1010b and one or more transceivers 1031a or 1031b, and execute instructions/programs stored in one or more memories 1010a or 1010b as disclosed herein. It is possible to perform the operation of the network node or the base station described in disclosure of this specification.

IV. Examples to which the Disclosure of the Present Specification Applies

Although not limited thereto, the various descriptions, functions, procedures, suggestions, methods, and/or flow charts of the disclosure of the present specification disclosed may be applied in various fields requiring wireless communication/connection (e.g. 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 17:
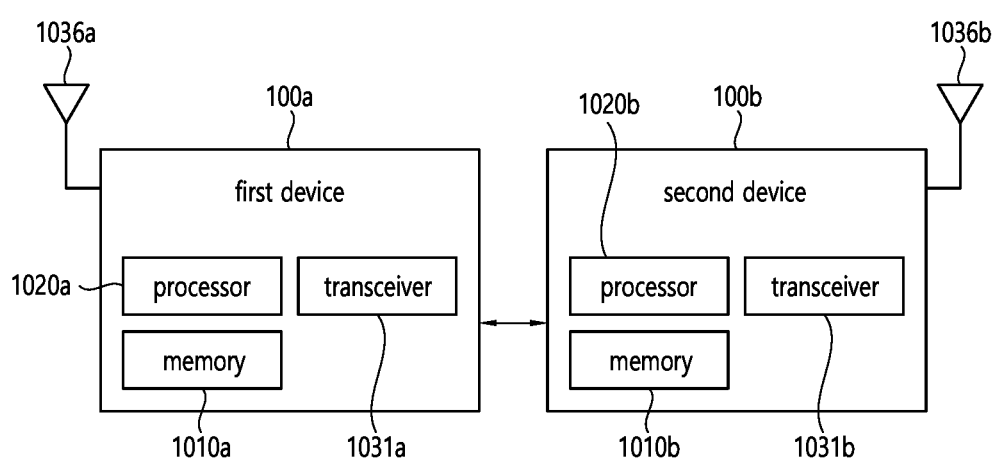
FIG. 17 illustrates a wireless communication system according to an embodiment.

FIG. 17 illustrates a wireless communication system according to an embodiment.

Referring to FIG. 17, a wireless communication system may include a first device 100a and a second device 100b. The first device 100a and the second device 100b may be wireless communication devices capable of performing wireless communication.

The first device (100a) may be the UE described in the disclosure of this specification. Alternatively, the first device (100a) may be a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100b) may be a network node (e.g. AMF or MME) described in the disclosure of this specification. Alternatively, the second device (100b) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

For example, the UE 100 includes a mobile phone, a smart phone, a laptop computer, a UE device for digital broadcasting, personal digital assistants (PDA), a portable multimedia player (PMP), a navigation system, and a slate PC (slate). PC, tablet PC, ultrabook, wearable device (e.g. watch-type UE device (smartwatch), glass-type UE device (smart glass), HMD (head mounted display)) and the like. For example, the HMD may be a display device worn on the head. For example, an HMD may be used to implement VR, AR or MR.

For example, the drone may be a flying vehicle that does not have a human and flies by a wireless control signal. For example, the VR device may include a device that implements an object or a background of a virtual world. For example, the AR device may include a device implemented by connecting an object or background of the virtual world to an object or background of the real world. For example, the MR device may include a device that implements a virtual world object or background by fusion with a real world object or background. For example, the hologram device may include a device for realizing a 360-degree stereoscopic image by recording and reproducing stereoscopic information by utilizing an interference phenomenon of light generated by the meeting of two laser beams called holography. For example, the public safety device may include an image relay device or an image device that can be worn on a user's body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, a medical device may be a device used for the purpose of diagnosing, treating, alleviating, treating, or preventing a disease. For example, a medical device may be a device used for the purpose of diagnosing, treating, alleviating or correcting an injury or disorder. For example, a medical device may be a device used for the purpose of examining, replacing, or modifying structure or function. For example, the medical device may be a device used for the purpose of controlling pregnancy. For example, the medical device may include a medical device, a surgical device, an (ex vivo) diagnostic device, a hearing aid, or a device for a procedure. For example, the security device may be a device installed to prevent a risk that may occur and maintain safety. For example, the security device may be a camera, CCTV, recorder or black box. For example, the fintech device may be a device capable of providing financial services such as mobile payment. For example, the fintech device may include a payment device or a Point of Sales (POS). For example, the climate/environment device may include a device for monitoring or predicting the climate/environment.

The first device (100a) includes at least one processor, such as a processor (1020a), and at least one memory, such as a memory (1010a), it may include at least one transceiver, such as transceiver (1031a). The processor (1020a) may perform the functions, procedures, and/or methods described above. The processor (1020a) may perform one or more protocols. For example, the processor (1020a) may perform one or more layers of an air interface protocol. The memory (1010a) is connected to the processor (1020a) and may store various types of information and/or commands.

The transceiver (1031a) may be connected to the processor (1020a) and may be controlled to transmit/receive a wireless signal.

The second device (100b) may include at least one processor such as a processor (1020b), at least one memory device such as a memory (1010b), and at least one transceiver such as a transceiver (1031b). The processor (1020b) may perform the functions, procedures, and/or methods described above. The processor (1020b) may implement one or more protocols. For example, the processor (1020b) may implement one or more layers of an air interface protocol. The memory (1010b) is connected to the processor (1020b) and may store various types of information and/or commands. The transceiver (1031b) may be connected to the processor (1020b) and may be controlled to transmit/receive a wireless signal.

The memory (1010a) and/or the memory (1010b) may be respectively connected inside or outside the processor (1020a) and/or the processor (1020b), and may be connected to other processors through various technologies such as wired or wireless connection.

The first device (100a) and/or the second device (100b) may have one or more antennas. For example, antenna (1036a) and/or antenna (1036b) may be configured to transmit and receive wireless signals.

Figure 18:
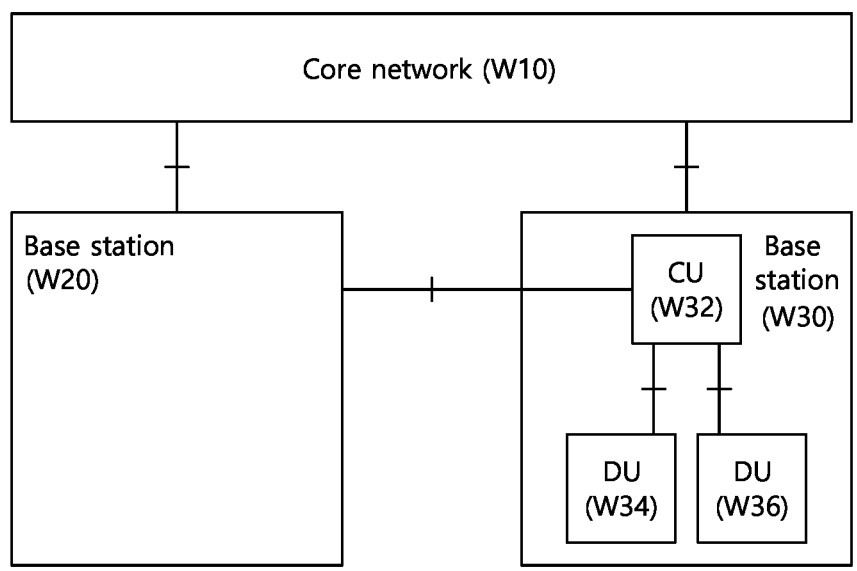
FIG. 18 illustrates a block diagram of a network node according to an embodiment.

FIG. 18 illustrates a block diagram of a network node according to an embodiment.

In particular, FIG. 18 is a diagram illustrating in detail a case in which a base station is divided into a central unit (CU) and a distributed unit (DU).

Referring to FIG. 18, base stations W20 and W30 may be connected to the core network W10, and the base station W30 may be connected to a neighboring base station W20. For example, the interface between the base stations W20 and W30 and the core network W10 may be referred to as NG, and the interface between the base station W30 and the neighboring base station W20 may be referred to as Xn.

The base station W30 may be divided into CUs W32 and DUs W34 and W36. That is, the base station W30 may be hierarchically separated and operated. The CU W32 may be connected to one or more DUs W34 and W36, for example, an interface between the CU W32 and the DUs W34 and W36 may be referred to as F1. The CU (W32) may perform functions of upper layers of the base station, and the DUs (W34, W36) may perform functions of lower layers of the base station. For example, the CU W32 is a radio resource control (RRC), service data adaptation protocol (SDAP), and packet data convergence protocol (PDCP) layer of a base station (e.g., gNB) hosting a logical node, and the DUs W34 and W36 may be logical nodes hosting radio link control (RLC), media access control (MAC), and physical (PHY) layers of the base station. Alternatively, the CU W32 may be a logical node hosting the RRC and PDCP layers of the base station (e.g., en-gNB).

The operation of the DUs W34 and W36 may be partially controlled by the CU W32. One DU (W34, W36) may support one or more cells. One cell can be supported by only one DU (W34, W36). One DU (W34, W36) may be connected to one CU (W32), and by appropriate implementation, one DU (W34, W36) may be connected to a plurality of CUs.

Figure 19:
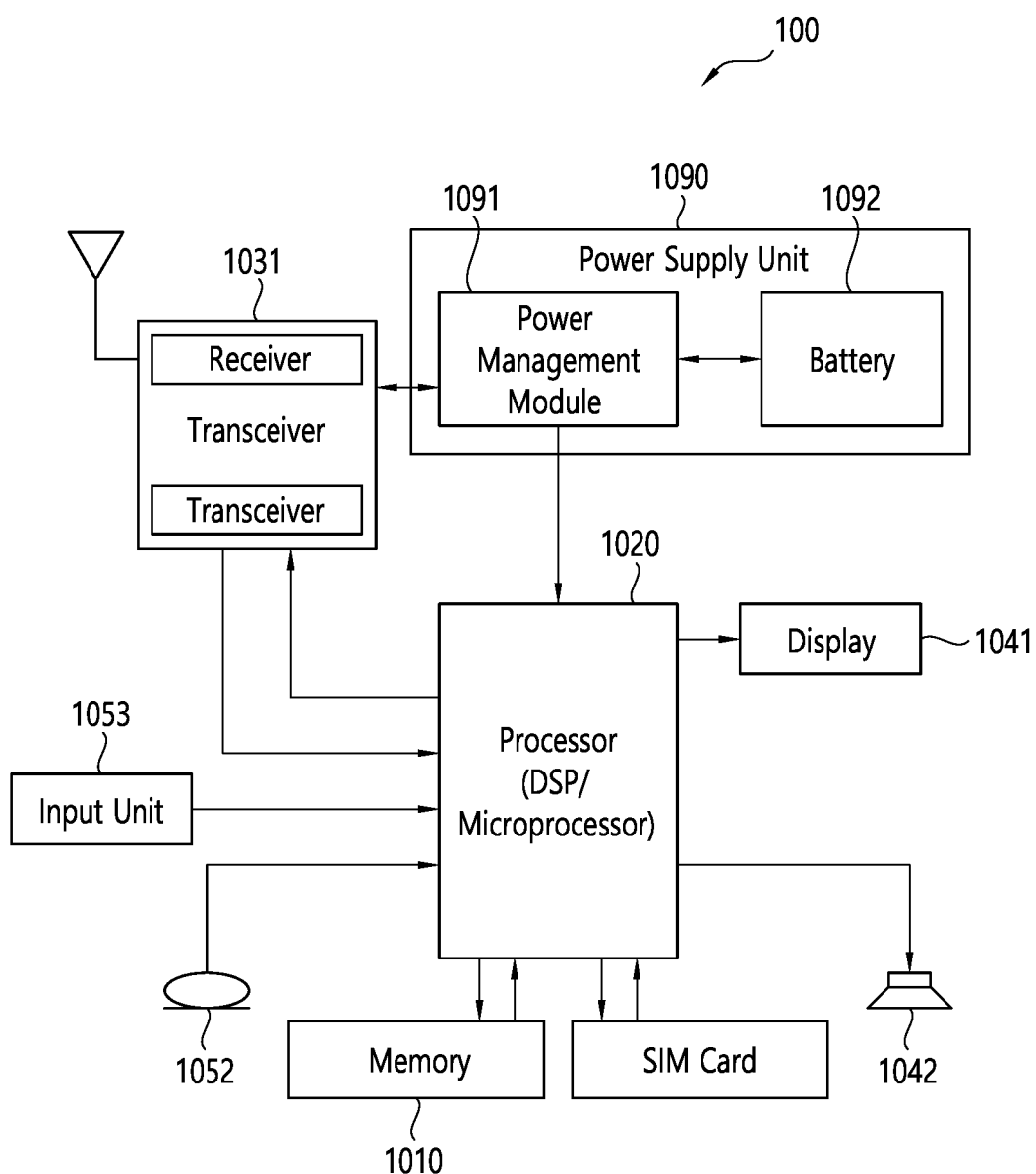
FIG. 19 is a block diagram illustrating the configuration of the UE 100 according to an embodiment.

FIG. 19 is a block diagram illustrating the configuration of the UE 100 according to an embodiment.

In particular, the UE 100 illustrated in FIG. 19 is a diagram illustrating the first apparatus of FIG. 17 in more detail.

The UE 100 includes a memory 1010, a processor 1020, a transceiver 1031, a power management module 1091, a battery 1092, a display 1041, an input unit 1053, a speaker 1042, and a microphone (1052), a subscriber identification module (SIM) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP (application processor). The processor (1020) may include at least one of a DSP (digital signal processor), a CPU (central processing unit), a GPU (graphics processing unit), and a modem (modulator and demodulator). Examples of processor (1020) include SNAPDRAGON™ series processors manufactured by Qualcomm®, EXYNOS™ series processors manufactured by Samsung®, a series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input (1053) receives input to be used by processor (1020). The input unit (1053) may be displayed on the display (1041). A SIM card is an integrated circuit used to securely store an IMSI (international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM (read-only memory), RAM (random access memory), flash memory, memory cards, storage media, and/or other storage devices. When the embodiment is implemented in software, the techniques described in this specification may be implemented in modules (e.g. procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

Figure 20:
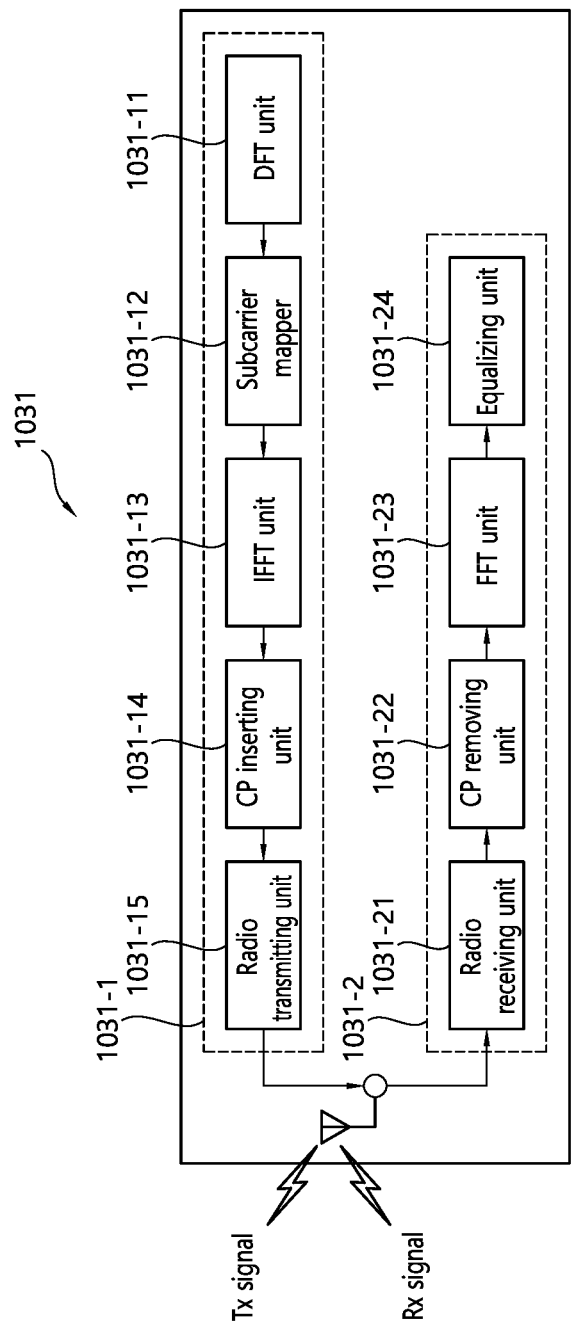
FIG. 20 is a detailed block diagram illustrating the transceiver of the first device shown in FIG. 17 or the transceiver of the device shown in FIG. 19 in detail.

FIG. 20 is a detailed block diagram illustrating the transceiver of the first device shown in FIG. 17 or the transceiver of the device shown in FIG. 19 in detail.

Referring to FIG. 20, the transceiver (1031) includes a transmitter (1031-1) and a receiver (1031-2). The transmitter (1031-1) includes a Discrete Fourier Transform (DFT) unit (1031-11), a subcarrier mapper (1031-12), an IFFT unit (1031-13) and a CP insertion unit (1031-14), and a wireless transmitter (1031-15). The transmitter (1031-1) may further include a modulator. In addition, for example, a scramble unit (not shown; scramble unit), a modulation mapper (not shown; modulation mapper), a layer mapper (not shown; layer mapper) and a layer permutator (not shown; layer permutator) may be further included, this may be disposed before the DFT unit (1031-11). That is, in order to prevent an increase in PAPR (peak-to-average power ratio), the transmitter (1031-1) passes information through the DFT (1031-11) before mapping a signal to a subcarrier. After subcarrier mapping is performed on the signal spread (or precoded in the same sense) by the DFT unit (1031-11) through the subcarrier mapper (1031-12), an IFFT (Inverse Fast Fourier Transform) unit (1031-13) to make it a signal on the time axis.

The DFT unit (1031-11) outputs complex-valued symbols by performing DFT on input symbols. For example, when Ntx symbols are input (however, Ntx is a natural number), the DFT size is Ntx. The DFT unit (1031-11) may be called a transform precoder. The subcarrier mapper (1031-12) maps the complex symbols to each subcarrier in the frequency domain. The complex symbols may be mapped to resource elements corresponding to resource blocks allocated for data transmission. The subcarrier mapper (1031-12) may be referred to as a resource element mapper. The IFFT unit (1031-13) outputs a baseband signal for data that is a time domain signal by performing IFFT on an input symbol. The CP insertion unit (1031-14) copies a part of the rear part of the base band signal for data and inserts it into the front part of the base band signal for data. ISI (Intersymbol interference) and ICI (Inter-Carrier Interference) are prevented through CP insertion, so that orthogonality can be maintained even in a multi-path channel.

On the other hand, the receiver (1031-2) includes a radio receiver (1031-21), a CP remover (1031-22), an FFT unit (1031-23), and an equalizer (1031-24). The radio receiving unit (1031-21), the CP removing unit (1031-22), and the FFT unit (1031-23) of the receiver (1031-2) include the radio transmitting unit (1031-15) in the transmitting end (1031-1), it performs the reverse function of the CP insertion unit (1031-14) and the IFF unit (1031-13). The receiver (1031-2) may further include a demodulator.

Figure 21:
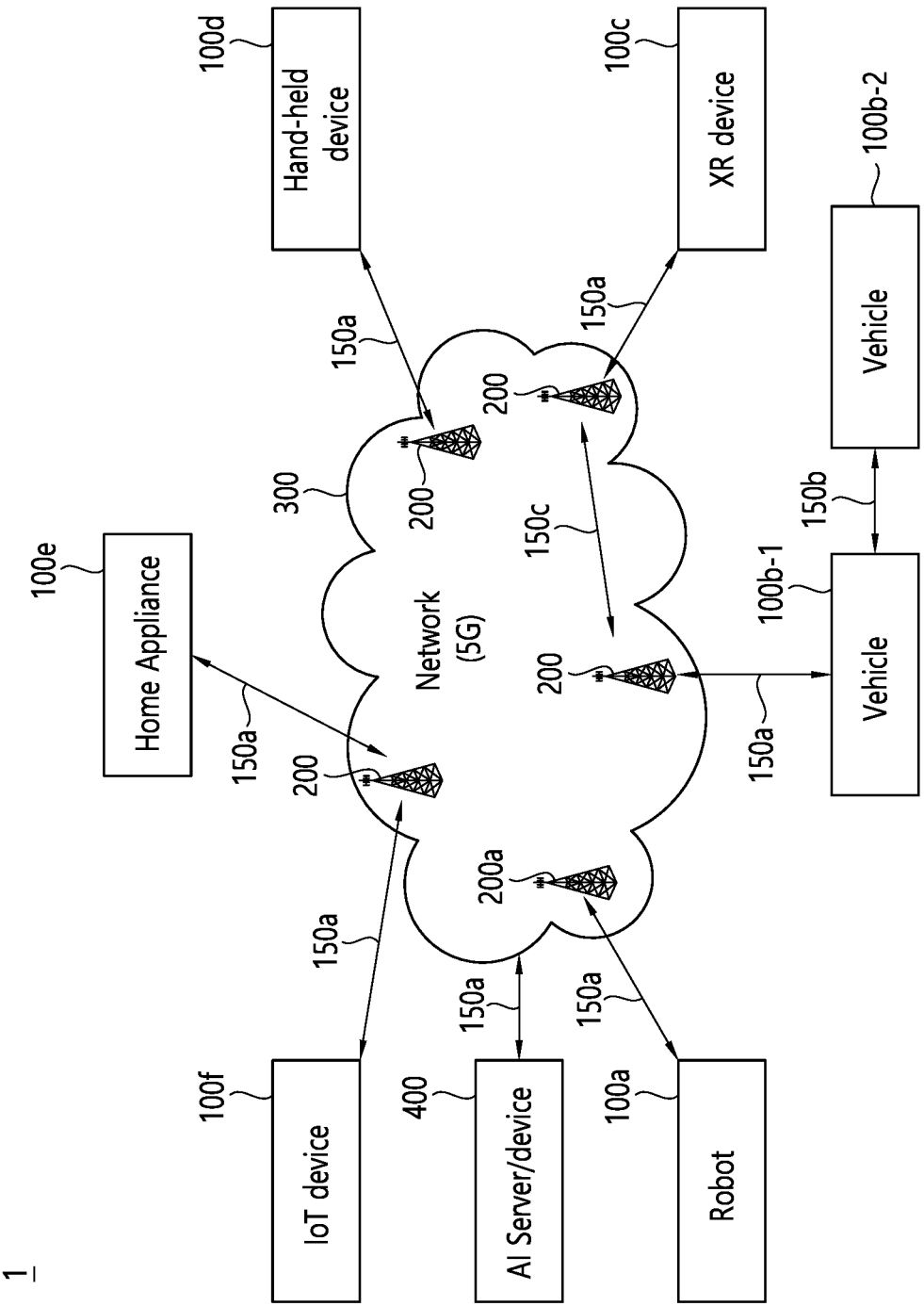
FIG. 21 illustrates a communication system 1 applied to the disclosure of the present specification.

FIG. 21 illustrates a communication system 1 applied to the disclosure of the present specification.

Referring to FIG. 21, a communication system (1) applied to the disclosure of the present specification includes a wireless device, a base station, and a network. Here, the wireless device may mean a device that performs communication using a wireless access technology (e.g. 5G NR (New RAT), LTE (Long Term Evolution)), and may be referred to as a communication/wireless/5G device. Although not limited thereto, the wireless device may include a robot (100a), a vehicle (100b-1, 100b-2), an XR (eXtended Reality) device (100c), a hand-held device (100d), and a home appliance (100e), an IoT (Internet of Thing) device (100f) and an AI device/server (400). For example, the vehicle may include a vehicle equipped with a wireless communication function, an autonomous driving vehicle, a vehicle capable of performing inter-vehicle communication, and the like. Here, the vehicle may include an UAV (Unmanned Aerial Vehicle) (e.g. a drone). XR devices include AR (Augmented Reality)/VR (Virtual Reality)/MR (Mixed Reality) devices, and include a HMD (Head-Mounted Device), a HUD (Head-Up Display) provided in a vehicle, a television, a smartphone, It may be implemented in the form of a computer, a wearable device, a home appliance, a digital signage, a vehicle, a robot, and the like. The portable device may include a smart phone, a smart pad, a wearable device (e.g. a smart watch, smart glasses), a computer (e.g. a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device (200a) may operate as a base station/network node to other wireless devices.

Here, the wireless communication technology implemented in the wireless devices 100a to 100f, 400, and 100 and 200 of FIG. 21 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100a to 100f and 400 of the present specification and 100 and 200 in FIG. 12 may perform communication based on the LTE-M technology. In this case, as an example, the LTE-M technology may be an example of an LPWAN technology, and may be called by various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, the wireless communication technology implemented in the wireless devices 100a to 100f and 400 of the present specification, and 100 and 200 in FIG. 15 may include at least any one of ZigBee, Bluetooth, and Low Power Wide Area Network (Low) in consideration of low power communication. Power Wide Area Network (LPWAN), but is not limited to the above-described name. For example, the ZigBee technology can create PAN (personal area networks) related to small/low-power digital communication based on various standards such as IEEE 802.15.4, and may be called by various names.

The wireless devices (100a-100f) may be connected to the network (300) through the base station (200). AI (Artificial Intelligence) technology may be applied to the wireless devices (100*a*-100*f*), and the wireless devices (100*a*-100*f*) may be connected to the AI server (400) through the network (300). The network (300) may be configured using a 3G network, a 4G (e.g. LTE) network, or a 5G (e.g. NR) network. The wireless devices (100*a*-100*f*) may communicate with each other through the base station (200)/network (300), but may also communicate directly (e.g. sidelink communication) without passing through the base station/network. For example, the vehicles (100*b*-1, 100*b*-2) may perform direct communication (e.g. Vehicle to Vehicle (V2V)/Vehicle to everything (V2X) communication). In addition, the IoT device (e.g. sensor) may directly communicate with other IoT devices (e.g. sensor) or other wireless devices (100*a*-100*f*).

Wireless communication/connection (150*a*, 150*b*, and 150*c*) may be performed between the wireless devices (100*a*-100*f*)/base station (200) and the base station (200)/base station (200). Here, the wireless communication/connection includes uplink/downlink communication (150*a*) and sidelink communication (150*b*) (or D2D communication), and communication between base stations (150*c*) (e.g. relay, IAB (Integrated Access Backhaul)). This can be done through technology (e.g. 5G NR) Wireless communication/connection (150*a*, 150*b*, 150*c*) allows the wireless device and the base station/radio device, and the base station and the base station to transmit/receive wireless signals to each other. For example, the wireless communication/connection (150*a*, 150*b*, and 150*c*) may transmit/receive a signal through various physical channels. To this end, based on various proposals of the present specification, at least some among various configuration information setting process for transmission/reception of a wireless signal, various signal treatment process (e.g. channel encoding/decoding, modulation/demodulation, resource mapping/demapping, etc.), resource allocation process and etc. may be performed.

The present specification may have various effects.

For example, through the procedure disclosed in this specification, an opportunity for resource selection may be increased for a terminal performing communication using a sidelink.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method, comprising:
   determining, by a first UE (User Equipment), transmission power for communication with a second UE by performing power control that reduces delta_P1 from the maximum transmission power of the first UE;
   receiving, by the first UE, control information from a third UE;
   wherein the control information includes delta_P3 that is the power value reduced by power control from the maximum transmission power of the third UE,
   measuring, by the first UE, a RSRP (Reference Signal Received Power) of a sidelink signal of the third UE, based on the control information;
   determining, by the first UE, an effective RSRP as 'the effective RSRP=the measured RSRP+(delta_P3−delta_P1)+offset';
   allocating, by the first UE, a resource for the communication with the second UE, based on the effective RSRP; and
   transmitting, by the first UE, a sidelink signal to the second UE with the determined transmission power.

2. The method of claim 1,
   wherein the control information includes information on whether the third UE perform power control or not.

3. The method of claim 1,
   wherein the step of allocating the resource for communication with the second UE comprises: comparing the effective RSRP with a selection threshold.

4. The method of claim 1,
   wherein the control information includes location information of the third UE,
   wherein the step of determining the effective RSRP comprises:
   determining pathloss based on the location information; and
   determining the effective RSRP based on the pathloss.

5. A first UE (user equipment), comprising:
   a transceiver; and
   a processor,
   wherein the processor performs operation comprising:
   determining, by a first UE, transmission power for communication with a second UE by performing power control that reduces delta_P1 from the maximum transmission power of the first UE:
   receiving, by the first UE, control information from a third UE;
   wherein the control information includes delta_P3 that is the power value reduced by power control from the maximum transmission power of the third UE,
   measuring, by the first UE, a RSRP (Reference Signal Received Power) of a sidelink signal of the third UE, based on the control information;
   determining, by the first UE, an effective RSRP as 'the effective RSRP=the measured RSRP+(delta_P3−delta_P1)+offset';
   allocating, by the first UE, a resource for the communication with the second UE, based on the effective RSRP; and transmitting, by the first UE, a sidelink signal to the second UE with the determined transmission power.

6. The first UE of claim 5, wherein the control information includes information on whether the third UE perform power control or not.

7. The first UE of claim 5, wherein the step of allocating the resource for communication with the second comprises: comparing the effective RSRP with a selection threshold.

8. The first UE of claim 5, wherein the control information includes location information of the third UE,
wherein the step of determining the effective RSRP comprises:
determining pathloss based on the location information; and
determining the effective RSRP based on the pathloss.

9. An apparatus, comprising:
at least one processor; and
at least one memory storing instructions and operably electrically connectable with the at least one processor, based on the instructions being operated by the at least one processor, performs an operation comprising:
determining, by a first apparatus, transmission power for communication with a second apparatus by performing power control that reduces delta_P1 from the maximum transmission power of the first apparatus;
receiving, by the first apparatus, control information from a third apparatus;
wherein the control information includes delta_P3 that is the power value reduced by power control from the maximum transmission power of the third apparatus,
measuring, by the first apparatus, a RSRP (Reference Signal Received Power) of a sidelink signal of the third apparatus, based on the control information;
determining, by the first apparatus, an effective RSRP as 'the effective RSRP=the measured RSRP+(delta_P3−delta_P1)+offset';
allocating, by the first apparatus, a resource for the communication with the second apparatus, based on the effective RSRP; and
transmitting, by the first apparatus, a sidelink signal to the second apparatus with the determined transmission power.

* * * * *